US012750504B2

(12) United States Patent
Ninan et al.

(10) Patent No.: US 12,750,504 B2
(45) Date of Patent: Sep. 29, 2026

(54) BETA SCALE DYNAMIC DISPLAY MAPPING

(71) Applicant: DOLBY LABORATORIES LICENSING CORPORATION, San Francisco, CA (US)

(72) Inventors: Ajit Ninan, San Jose, CA (US); Gregory John Ward, Berkeley, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 140 days.

(21) Appl. No.: 18/832,349

(22) PCT Filed: Jan. 30, 2023

(86) PCT No.: PCT/US2023/011847
§ 371 (c)(1),
(2) Date: Jul. 23, 2024

(87) PCT Pub. No.: WO2023/150074
PCT Pub. Date: Aug. 10, 2023

(65) Prior Publication Data

US 2025/0106410 A1 Mar. 27, 2025

Related U.S. Application Data

(60) Provisional application No. 63/305,626, filed on Feb. 1, 2022.

(30) Foreign Application Priority Data

Feb. 11, 2022 (EP) .................................... 22156275

(51) Int. Cl.
*H04N 19/186* (2014.01)
*H04N 19/105* (2014.01)
(Continued)

(52) U.S. Cl.
CPC ......... *H04N 19/186* (2014.11); *H04N 19/105* (2014.11); *H04N 19/117* (2014.11); *H04N 19/34* (2014.11); *H04N 19/42* (2014.11)

(58) Field of Classification Search
CPC .. H04N 19/186; H04N 19/105; H04N 19/117; H04N 19/34; H04N 19/42
See application file for complete search history.

(56) References Cited

U.S. PATENT DOCUMENTS 8,339,475 B2 12/2012 Atanassov
9,621,767 B1 4/2017 El Mezeni
(Continued)

FOREIGN PATENT DOCUMENTS

EP 2993886 A1 3/2016
EP 3295451 B1 7/2020
(Continued)

OTHER PUBLICATIONS

"Image parameter values for high dynamic range television for use in production and international programme exchange", REC. ITU-R BT.2100, Jun. 2017 (Jun. 1, 2017), 16 pages.
(Continued)

*Primary Examiner* — Chong Wu

(57) ABSTRACT

An input image to be coded into a video signal and a target image are received. The input image and the target image depict same visual content. One or more beta scaling method indicators and one or more sets of one or more beta scale parameters are generated. The one or more beta scaling method indicators indicate one or more beta scaling methods that use the one or more sets of beta scale parameters to perform beta scaling operations on the input image to generate a reconstructed image to approximate the target image. The input image, along with the one or more beta scaling method indicators and the one or more sets of beta scale parameters, is encoded into the video signal for allow-
(Continued)

ing a recipient device of the video signal to generate the reconstructed image.

20 Claims, 9 Drawing Sheets

(51) Int. Cl.

| | |
|---|---|
| ***H04N 19/117*** | (2014.01) |
| ***H04N 19/34*** | (2014.01) |
| ***H04N 19/42*** | (2014.01) |

(56) References Cited

U.S. PATENT DOCUMENTS

| | | | | |
|---|---|---|---|---|
| 9,961,237 | B2 | 5/2018 | Atkins | |
| 10,080,026 | B2 | 9/2018 | Su | |
| 10,244,244 | B2 | 3/2019 | Piramanayagam | |
| 10,249,263 | B2 | 4/2019 | Hendry | |
| 10,332,481 | B2 | 6/2019 | Atkins | |
| 10,536,692 | B2 * | 1/2020 | Huang | H04N 19/513 |
| 10,609,395 | B2 * | 3/2020 | Kerofsky | H04N 19/157 |
| 10,645,403 | B2 | 5/2020 | Song | |
| 10,652,579 | B2 | 5/2020 | Lakshman | |
| 10,659,749 | B2 | 5/2020 | Kadu | |
| 10,992,941 | B2 | 4/2021 | Lu | |
| 11,158,026 | B1 | 10/2021 | Kamal | |
| 2005/0094729 | A1 | 5/2005 | Yuan | |
| 2012/0147953 | A1 | 6/2012 | El-Mahdy | |
| 2013/0335438 | A1 | 12/2013 | Ward | |
| 2014/0003527 | A1 | 1/2014 | Tourapis | |
| 2016/0295220 | A1 | 10/2016 | Oh | |
| 2017/0357327 | A1 | 12/2017 | Dimitrov | |
| 2018/0359489 | A1 | 12/2018 | Lakshman | |
| 2019/0104324 | A1 | 4/2019 | Han | |
| 2019/0311694 | A1 * | 10/2019 | Van Mourik | H04N 9/67 |
| 2020/0351524 | A1 | 11/2020 | Lee | |
| 2020/0382802 | A1 | 12/2020 | Atkins | |
| 2021/0166353 | A1 | 6/2021 | Chen | |
| 2025/0133224 | A1 * | 4/2025 | Ninan | H04N 19/16 |

FOREIGN PATENT DOCUMENTS

| | | | |
|---|---|---|---|
| IN | 201641015395 | A | 11/2017 |
| WO | 2019199701 | A1 | 10/2019 |
| WO | 2019217751 | A1 | 11/2019 |
| WO | 2020219341 | A1 | 10/2020 |
| WO | 2023150074 | A1 | 8/2023 |

OTHER PUBLICATIONS

"Parameter values for ultra-high definition television systems for production and international programme exchange", ITU REC. ITU-R BT.2020-2, Oct. 2015 (Oct. 1, 2015), 8 pages.

ITU Rec. ITU-R BT. 1886, "Reference electro-optical transfer function for flat panel displays used in HDTV studio production," (Mar. 2011), 7 pages.

SMPTE ST 2084:2014 "High Dynamic Range EOTF of Mastering Reference Displays", 15 pages.

Scott et al., Multi-plane Image Video Compression, 2020 IEEE 22nd International Workshop Multimedia Signal Processing (MMSP), Sep. 21, 2020 (Sep. 21, 2020), pp. 1-6, 6 pages.

* cited by examiner

BETA SCALE DYNAMIC DISPLAY MAPPING

CROSS-REFERENCE TO RELATED APPLICATIONS

This application is the U.S. National stage entry of International Patent Application No. PCT/US2023/011847 filed Jan. 30, 2023, which claims priority of the U.S. Provisional Application No. 63/305,626 filed Feb. 1, 2022 and European Patent Application No. 22156275.4 filed Feb. 11, 2022, all of which is incorporated herein by reference in its entirety.

TECHNOLOGY

The present invention relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g., interchangeably.

As used herein, the term high dynamic range (HDR) relates to a DR breadth that spans the some 14-15 or more orders of magnitude of the HVS. In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a viewer or the HVS that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components/channels (e.g., luma Y and chroma Cb and Cr) of a color space, where each color component/channel is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance, represented in a codeword among codewords representing an image, etc.) of an input video signal to output screen color values (e.g., screen luminance, represented in a display drive value among display drive values used to render the image, etc.) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The HVS responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 *"High Dynamic Range EOTF of Mastering Reference Displays"* (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 302 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). Example (e.g., HDR, Hybrid Log Gamma or HLG, etc.) EOTFs are defined in SMPTE 2084 and Rec. ITU-R BT.2100, *"Image parameter values for high dynamic range television for use in production and international programme exchange,"* (06/2017). See also ITU Rec. ITU-R BT.2020-2, *"Parameter values for ultra-high definition television systems for production and international programme exchange,"* (October 2015), which is incorporated herein by reference in its entirety and relates to Rec. 2020 or BT. 2020 color space. As appreciated by the inventors here, improved techniques for coding high quality video content data to be rendered with a wide variety of display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
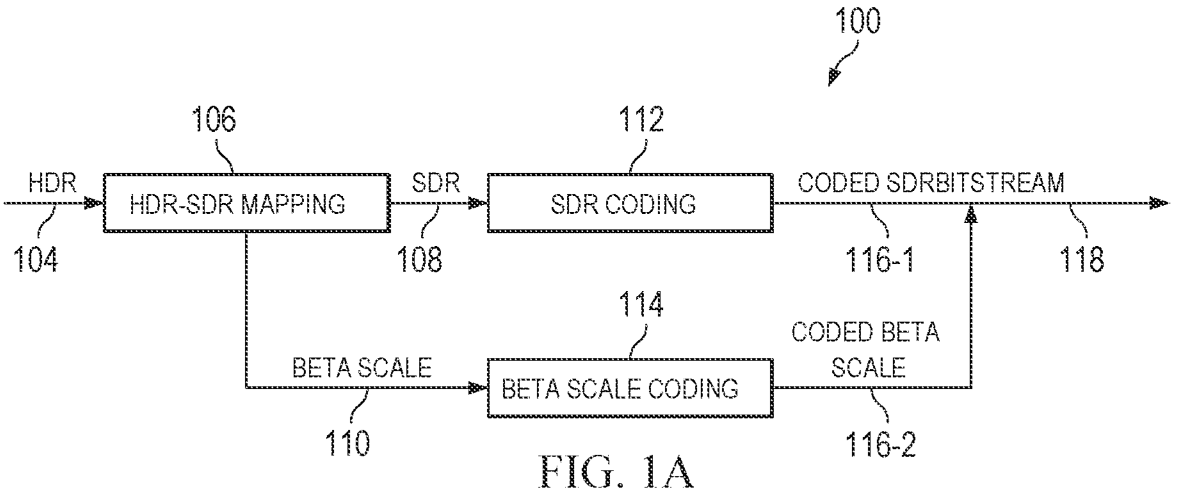
FIG. 1A illustrates an example upstream device.

Example embodiments, which relate to beta scale dynamic display mapping, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. EXAMPLE VIDEO CODECS FOR BETA SCALING
3. BETA SCALING
4. BETA SCALE DATA SET
5. OVERALL BETA SCALE MAP FOR SOME OR ALL CHANNELS
6. INDIVIDUAL BETA SCALE MAPS FOR INDIVIDUAL CHANNELS
7. CROSS-CHANNEL MAPPING
8. EXAMPLE BETA SCALE DATA REPRESENTATIONS
9. BETA SCALING IN LIEU OF OTHER IMAGE PROCESSING OPERATIONS
10. EXAMPLE PROCESS FLOWS
11. IMPLEMENTATION MECHANISMS-HARDWARE OVERVIEW
12. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Under some approaches, a relatively large number of image processing operations may be individually performed (e.g., in a processing chain, loop, etc.) by video codecs to generate display images (e.g., uncompressed images communicated over a HDMI video link, uncompressed images in a picture buffer, etc.) for rendering on an image display. In various embodiments, these image processing operations may include, but are not necessarily limited to only, any, some or all of: content mapping with no or little human input, content mapping with human input, tone mapping, color space conversion, display mapping, perceptual quantization (or PQ), non-perceptual quantization (or non-PQ), linear or non-linear coding, image blending, image mixing, linear image mapping, non-linear image mapping, applying EOTF, applying electro-to-electro transfer function (EETF), applying opto-to-electro transfer function (OETF), spatial or temporal downsampling, spatial or temporal upsampling, spatial or temporal resampling, chroma sampling format conversion, etc.

In addition, (e.g., content dependent, per-image, per-scene, etc.) individual operational parameters may be generated for these image processing operations, respectively. These operational parameters respectively generated for the image processing operations are signaled in a video signal, taking up a relatively large amount of available or supported bitrate to transmit or stream the video signal from an upstream device to a downstream recipient device.

In contrast, under techniques as described herein, some or all of these image processing operations used to generate the display images for rendering on the image display can be implemented, incorporated into, or performed by way of, beta scaling operations.

For example, the same beta scaling can be used to incorporate or implement in lieu of other image processing operations including but not limited to: any, some or all of: content mapping with no or little human input, content mapping with human input, tone mapping, color space conversion, display mapping, PQ, non-PQ, linear or non-linear coding, image blending, image mixing, linear image mapping, non-linear image mapping, applying EOTF, applying EETF, applying OETF, spatial or temporal downsampling, spatial or temporal upsampling, spatial or temporal resampling, chroma sampling format conversion, etc.

Beta scaling operations as described herein can be implemented as simple scaling operations that apply (e.g., linear, etc.) multiplications and/or additions. Additionally, optionally or alternatively, beta scaling operations as described herein can be implemented in complex or non-linear scaling operations including but not limited to LUT-based scaling. The beta scaling operations may be performed only once at runtime to realize or produce (equivalent) effects of the other image processing operations in lieu of which the beta scaling operations are performed. As a result, relatively complicated image processing operations permeated through an image processing chain/pipeline/framework can be avoided or much simplified under beta scaling techniques as described herein.

Under other approaches that do not implement techniques as described herein, relatively large sized image metadata can be generated to include operational parameters used in connection with the other image processing operations. Such image metadata may include numerous operational parameters specifying LUTs, tone mapping curves, polynomials, etc., and need to use a relatively large bitrate to deliver these operational parameters.

In contrast, under techniques as described herein, beta scale maps—which may comprise simple ratios for simple arithmetic operations such as multiplication/addition, one or more LUT identifiers for LUTs preconfigured on a recipient device, etc.—can be delivered to the recipient device in lieu of the numerous operational parameters in the other approaches. Numerical repetitions existing in the beta scale maps can also be beneficially exploited with adaptive coding to compress the beta scale maps and reduce the user of available bitrate to signal or transmit the beta scale maps from an upstream device to a downstream recipient device.

Beta scaling as described herein can support global mapping (e.g., global tone mapping, etc.), local mapping (e.g., local tone mapping, etc.) or a combination of global and local mapping. To support local mapping, beta scaling methods and/or scaling method parameters (e.g., scaling ratios or factors, etc.) can be individually selected or determined for scaling pixel or codeword values in different spatial regions of an image. Additionally, optionally or alternatively, beta scaling methods and/or scaling method parameters (e.g., scaling ratios or factors, etc.) can be individually selected or determined for scaling different images in a group of pictures.

For example, global scaling ratio values may be defined in beta scale data set(s) for scaling pixel or codeword values in most images in a group of pictures or scene or for scaling pixel or codeword values in most spatial regions of an image. Local scaling ratio values may also be defined (e.g., to override the global scaling ratios, etc.) in the beta scale data set(s) for scaling pixel or codeword values in the remaining images in the group of pictures or scene or for scaling pixel or codeword values in the remaining spatial regions of the image.

In some operational scenarios, a video signal can be of a signal structure that includes two signal layers or sub-streams: one (e.g., base layer, sub-stream, etc.) encoded with images, and the other (e.g., enhancement layer, sub-stream, etc.) encoded with the beta scale data set(s).

Example embodiments described herein relate to encoding image content. An input image to be coded into a video signal and a target image are received. The input image and the target image depict same visual content. One or more beta scaling method indicators and one or more sets of one or more beta scale parameters are generated. The one or more scaling methods indicators indicate one or more beta scaling methods that use the one or more sets of beta scale parameters to perform beta scaling operations on the input image to generate a reconstructed image to approximate the target image. The input image, along with the one or more beta scaling method indicators and the one or more sets of beta scale parameters, is encoded into the video signal for allowing a recipient device of the video signal to generate the reconstructed image Example embodiments described herein relate to decoding image content. An input image is decoded from a video signal. One or more beta scaling method indicators and one or more sets of one or more beta scale parameters are decoded from the video signal. Beta scaling operations as specified with the one or more beta scaling method indicators and one or more sets of one or more beta scale parameters are performed on the input image to generate a reconstructed image. A display image derived from the reconstructed image is caused to be rendered on a target image display.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Example Video Codecs for Beta Scaling

FIG. 1A illustrates an example upstream device 100 (e.g., video codecs, video encoder, video transcoder, video streaming server, etc.) that can be used to receive (e.g., a sequence of consecutive, input, etc.) HDR images and generate a video signal such as a coded bitstream 118 that encoded with SDR content converted from the HDR images. Some or all of the upstream device (100) may be implemented with one or more of: computing processors, audio and video codecs, such as those defined by ATSC, DVB, DVD, Blu-Ray, and other delivery formats, digital signal processors, graphic processing units or GPUs, etc.

Input HDR images 104 can be received by an HDR-to-SDR (or HDR-SDR in short) mapping block 106. These HDR images (104) may be received from a video source or retrieved from a video data store. Some or all of the HDR images (104) can be generated from source images, for example through (e.g., automatic with no human input, manual, automatic with human input, etc.) video editing or transformation operations, color grading operations, etc. The source images may be digitally captured (e.g., by a digital camera, etc.), generated by converting analog camera pictures captured on film to a digital format, generated by a computer (e.g., using computer animation, image rendering, etc.), and so forth. The HDR images (104) may be images relating to one or more of: movie releases, archived media programs, media program libraries, video recordings/clips, media programs, TV programs, user-generated video contents, etc.

The HDR-SDR mapping block (106) applies image content mapping operations (or HDR-to-SDR content mapping or conversion operations) to each HDR image in the HDR images (104) to generate a respective (mapped) SDR image in corresponding mapped SDR images 108 that depict the same visual semantic content as the HDR images (104) but with a narrower dynamic range than that of the HDR images (104).

The HDR images (104) and the mapped SDR images (108) form image pairs of HDR images and SDR images. For example, the HDR image and its respective SDR image as mentioned above form an image pair of HDR image and SDR image in the image pairs formed by the HDR images (104) and the mapped SDR images (108).

The HDR-SDR mapping block (106) can use the HDR images (104) and the SDR images (108) to generate beta scale data sets 110. For example, an HDR image in an image pair as described herein and an SDR image in the same image pair can be used by the HDR-SDR mapping block (106) to derive an array of ratios (e.g., via division operations in a non-logarithmic domain or representation, via subtraction operations in a logarithmic domain or representation, etc.) between SDR codewords at an array of pixel locations of the SDR image and corresponding HDR codewords at a corresponding array of pixel locations of the HDR image. Some or all of the array of ratios (e.g., scaling factors, etc.) can be used to derive a beta scale data set for the image pair.

The mapped SDR images (108) and the beta scale data sets (110) may be encoded by the upstream device (100) into a video signal such as the coded bitstream (118). As shown in FIG. 1A, an SDR coding 112 may receive the mapped SDR images (108) as first input and use the first input to generate coded SDR content 116-1 as a part of the coded bitstream (118). A beta scale coding 114 may receive the beta scale data sets (110) as second input and use the second input to generate coded beta scale data sets 116-2 as a part of the coded bitstream (118). In an example in which the coded bitstream (118) is of a single or multi-layer signal structure, the coded SDR images (116-1) may be carried in a base layer in the coded bitstream (118), whereas the coded beta scale data sets (116-2) may be carried as a part of image metadata in image metadata containers carried in the coded bitstream (118). In another example in which the coded bitstream (118) is of a multi-layer signal structure, the coded SDR images (116-1) may be carried in a base layer of multiple layers in the coded bitstream (118), whereas the coded beta scale data sets (116-2) may be carried in a second, non-base layer of the multiple layers in the coded bitstream (118).

In some operational scenarios, the coded bitstream (118) may represent a backward compatible video signal that is optimized for rendering SDR images on a wide variety of image displays. Here, a "backward compatible" video signal refers to a video signal that carries encoded SDR images optimized (e.g., with specific artistic intent preserved, etc.) for SDR image displays.

The bitstream (118) is then delivered downstream to downstream recipient devices such as mobile devices, tablet computers, decoding and playback devices, media source devices, media streaming client devices, television sets (e.g., smart TVs, etc.), set-top boxes, movie theaters, and the like. The coded bitstream (118) can be received by a recipient device to decode and to generate SDR images for displaying or rendering on an SDR image display. Additionally, optionally or alternatively, beta scale data sets and/or image metadata can be decoded from the coded bitstream (118) by the recipient device and used to generate HDR images for displaying or rendering on an HDR image display. Example HDR displays may include, but are not limited to, image displays operating in conjunction with TVs, mobile devices, home theaters, etc. Example SDR displays may include, but are not limited to, SDR TVs, mobile devices, home theater displays, head-mounted display devices, wearable display devices, etc.

Figure 1B:
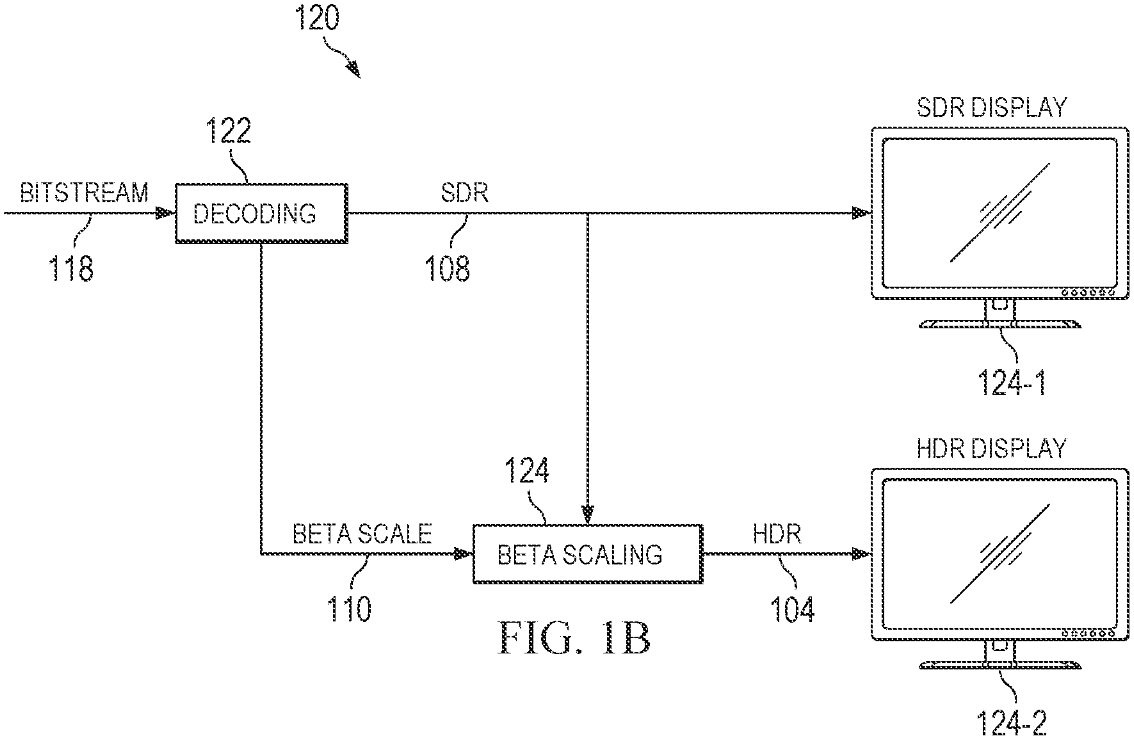
FIG. 1B illustrates an example downstream device.

FIG. 1B illustrates an example downstream device 120 (e.g., video codecs, video decoder, video transcoder, video streaming client, set-top box, smart television, augmented reality device, virtual reality device, mixed reality device, etc.) that can be used to decode the coded bitstream (118), generate reconstructed HDR images, etc. Some or all of the downstream device (120) may be implemented with one or more of: computing processors, audio and video codecs, such as those defined by ATSC, DVB, DVD, Blu-Ray, and other delivery formats, digital signal processors, graphic processing units or GPUs, etc.

As shown in FIG. 1B, the coded bitstream (118) is decoded by a decoding block 122 to generate decoded SDR images which may be the same as the SDR images (108) in the upstream device (100) subject to coding errors introduced by compression/decompression and/or quantization/dequantization and/or transmission errors and/or synchronization errors and/or errors caused by packet losses. The decoded SDR images (108) may be sent to an SDR display 124-1 for rendering, for example via an HDMI video link without compression.

The decoding block (122) can also retrieve or decode the image metadata or coded beta scale data sets from the coded bitstream (118). The coded beta scale data can be retrieved or decoded to derive or reconstruct the beta scale data sets (110) in the upstream device (100) subject to coding errors introduced by compression/decompression and/or quantization/dequantization and/or transmission errors and/or synchronization errors and/or errors caused by packet losses.

As shown in FIG. 1B, the SDR images (108) and the beta scale data sets (110) can be used by a beta scaling block 124 to generate the reconstructed HDR images as previously mentioned. Beta scaling operations can be performed on the decoded SDR images (108) using the ratios obtained from the beta scale data sets (110) to generate the reconstructed HDR images for rendering on an HDR (e.g., target, reference, etc.) display 124-2. The reconstructed HDR images may be sent to the HDR display (124-2) for rendering, for example via an HDMI video link without compression.

Additionally, optionally, or alternatively, the image metadata retrieved from the coded bitstream (118) may include display management (DM) metadata that can be used by the downstream recipients to perform display management operations on the reconstructed images and/or the decoded SDR images (108) to generate display images (e.g., HDR display images, SDR display images, mobile display images, etc.) optimized for rendering on an HDR, SDR or mobile image display, which may not have the same display capabilities as those of the HDR image display (124-2) or the SDR image display (124-1).

In operational scenarios in which the recipient device (120) operates with (or is attached to) the SDR image display (124-1) that supports the standard dynamic range or a relatively narrow dynamic range, the recipient device (120) can render the decoded SDR images (108) directly or indirectly on the target display (124-1).

In operational scenarios in which the recipient device (120) operates with (or is attached to) the HDR image display (124-2) that supports a high dynamic range (e.g., 400 nits, 1000 nits, 4000 nits, 10000 nits or more, etc.), the recipient device (120) can extract the beta scale data sets (110) from (e.g., the metadata container in, a non-base layer in, etc.) the coded bitstream (118) and use the beta scale data sets (110) to generate the reconstructed HDR images (104).

In addition, as noted, in some operational scenarios, the recipient device (120) can extract the DM metadata from the coded bitstream (118) and apply DM operations on the reconstructed HDR images (104) or the decoded SDR images (108) based on the DM metadata to generate and render display images optimized for rendering on an image display other than the HDR image display (124-2) and the SDR image display (124-1).

3. Beta Scaling

Under some approaches, an HDR image received by an image processing device such as an upstream device may be converted into a corresponding reshaped SDR image via global reshaping. Global reshaping refers to codeword conversion—from an input image to a reshaped image—that applies the same global reshaping function or mapping (also known as a global tone mapping operator) to all pixels of the input image such as an input HDR or SDR image to generate a corresponding output image—such as a reshaped SDR or HDR image—depicting the same visual semantic content as the input image.

In a first example, a global reshaping function or mapping can be used to convert (HDR) luminance or luma codewords represented in a luma channel/component of an HDR image into (SDR) luminance or luma codewords represented in a corresponding luma channel/component of a corresponding SDR image. Similarly, a global reshaping function or mapping can be used to convert (HDR) chrominance or chroma codewords represented in each of chroma channels/components of the HDR image into (SDR) chrominance or chroma codewords represented in a corresponding chroma channel/component of the SDR image.

In a second example, three global reshaping functions or mappings can be used to respectively convert (HDR) RGB codewords represented in RGB channels or components of an HDR image into (SDR) RGB codewords represented in corresponding RGB channels or components of a corresponding SDR image.

These global reshaping functions/mappings—which may be represented as part of image metadata in the form of polynomials, tone mapping curves, matrixes, a three-dimensional lookup table (3D LUT), etc.—can be included or signaled in a video signal, for example encoded with the globally reshaped SDR image. A downstream recipient device of the video signal can apply the global reshaping functions/mappings to the globally reshaped SDR image for the purpose of generating a reconstructed HDR image approximating the HDR image giving rise to the reshaped SDR image in the upstream device.

Example global reshaping operations are described in U.S. Provisional Patent Application Ser. No. 62/136,402, filed on Mar. 20, 2015, (also published on Jan. 18, 2018, as U.S. Patent Application Publication Ser. No. 2018/0020224), and PCT Application Ser. No. PCT/US2019/031620, filed on May 9, 2019, their entire contents of which are hereby incorporated by reference as if fully set forth herein.

Visual sensitivity of the HVS is highly dependent on local image details (or spatial variations of codewords) and local light adaptation levels. For example, when looking at a relatively bright image portion (of an image) such as depicting sky, the HVS (e.g., a color grader, a video professional, etc.) may be adapted to a relatively high light adaptation level and to become relatively sensitive to differences and contrasts in relatively high luminances. When looking at a relatively dark image portion (of an image) such as depicting trees, the HVS may be adapted to a relatively low light adaptation level and to become relatively sensitive to differences and contrasts in relatively low luminances.

While being relatively easy to implement, global reshaping may degrade visual qualities of the resultant reshaped or reconstructed images and even introduce visual artifacts such as halo around object boundaries in these images. For example, a human face may comprise many image details or spatial variations of codewords. Background such as wall may comprise much less image details or spatial variations of codewords. Applying the same global reshaping function or mapping to foreground pixels depicting the human face and background pixels depicting the wall in an input image such as an HDR image can cause (e.g., artifacts, artificial, not existing in reality, etc.) halos to be formed around the human face in a resultant reshaped or reconstructed image to which the HDR image is converted by the global reshaping function or mapping.

In contrast, beta scaling operations under techniques as described herein can be implemented or performed to recover an original image or generate a reconstructed image—e.g., the same as or closely approximating the original image subject to quantization/coding errors in compression/decompression and/or quantization/dequantization—in which different image portions may have different local (or non-global) mappings or relationships with corresponding image portions in an encoded image in a video signal generated by an upstream device. Additionally, optionally or alternatively, in some operational scenarios, the video signal can be free of global mapping image metadata such as 3D LUTs.

A beta scale data set can be included or encoded along with the encoded image in the same video signal for a downstream recipient device of the video signal to use the beta scale data set to perform some or all of the beta scaling operations on a decoded image—as derived from decoding the encoded image from the video signal—to recover the original image or generate the reconstructed image corresponding to the original image.

The beta scale data set can comprise or include scaling method selectors and/or scaling factors for pixels, pixel blocks, etc., of the decoded image. A scaling method selector as described herein may be used by the recipient device to determine, identify or select, for example from among a plurality of scaling methods, a specific scaling method (e.g., a specific mapping curve, a specific one-dimensional or ID LUT, a specific 3D LUT, a specific single- or multi-piece polynomial, a specific multi-channel mapping matrix, etc.) to be used for one of: a specific pixel in the decoded image, a specific pixel block in the decoded image, the entire decoded image, an entire scene including the decoded image, a group of pictures/images or GOP including the decoded image, etc. A scaling factor as described herein may be used by the recipient device to apply a scaling operation (e.g., multiplication of the scaling factor in a non-logarithmic representation or domain, addition of the scaling factor in a logarithmic representation or domain, linear mapping with both multiplication of the scaling factor and an addition or offset, etc.) to (e.g., luma, chroma, RGB, YCbCr, etc.) codeword(s) in pixel(s) corresponding to one of: a specific pixel in the decoded image, a specific pixel block in the decoded image, the entire decoded image, an entire scene including the decoded image, a group of pictures/images or GOP including the decoded image, etc.

Additionally, optionally or alternatively, in some operational scenarios, the beta scale data set can be used to apply non-linear scaling methods to scaling codewords in the decoded image. For example, a scaling method selector may be indicated in the beta scale data set and used to select a non-linear scaling method such as a non-linear function (e.g., a sigmoid function, a power function, etc.) for a spatial region in the decoded image. In addition, a scaling factor corresponding to the scaling method selector can be indicated in the beta scale data set and used as a controlling parameter (or an input parameter) in the non-linear function to determine or set a specific curve or shape, instead of being used to directly and linearly multiply with pre-scaled codeword(s) to derive scaled codeword(s).

Additionally, optionally or alternatively, in some operational scenarios, the beta scale data set can be used to apply different scaling methods to different value sub-ranges in an entire codeword value range. The entire codeword value range may represent a specific dimension (e.g., color space component, color space channel, etc.) in a multi-dimensional (e.g., three-dimensional, three color channels/components, etc.) codeword space. The codeword space may comprise all available codewords in all channels/components of a color space (e.g., RGB color space, YCbCr color space, etc.). By way of example, the entire codeword value range may be represented by a specific dynamic range such as a specific HDR or a specific SDR. Pixels of luminance or luma codeword values in a first sub-range of the dynamic range such as a bright range in an input image may be scaled or mapped using a first scaling method—as indicated in the beta scale data set—that applies a single first reshaping mapping curve to these luminance or luma codewords. Pixels of luminance or luma codeword values in a second sub-range of the dynamic range such as a mid-tone range in an input image may be scaled or mapped using a second scaling method—as indicated in the beta scale data set—that applies different scaling factors in different local image portions to different luminance or luma codewords among the luminance or luma codewords in the mid-tone range.

4. Beta Scale Data Set

A beta scale data set can be coded, along with a coded image, in a video signal. The beta scale data set can be generated for the coded image by an upstream device and sent in the video signal to a downstream recipient device along with the coded image. The beta scale data set enables the recipient device to perform beta scaling operations on a decoded image—corresponding to or derived from decoding the coded image retrieved from the video signal—to generate a reconstructed image that is the same as or closely approximates a target image.

Example target images as described herein may include, but are not necessarily limited to, an original image giving rise to the encoded image, a display image to be directly rendered on a target image display without performing DM operation, a display image to be rendered on a target image display without applying a display-specific electro-to-optical transfer function (EOTF), etc.

Each pixel in a coded image may comprise one or more (component) codewords in one or more (color) channels/components, respectively, of a color space (e.g., RGB color space, YCbCr color space, etc.). Component codewords in a specific channel/component (e.g., red color channel/component, etc.) of the color space (e.g., RGB color space, etc.) for all pixels or pixel locations in the coded image collectively form a coded component image. Hence, the coded image may comprise one or more coded component images corresponding to the one or more channels or components of the color space in which the coded image is represented.

In some operational scenarios, different component images of a coded image as described herein may be scaled using an overall beta scale map as defined or specified in a beta scale data set corresponding to the coded image. Beta scale parameter values in the overall beta scale map of the beta scale data set may be used to enable the recipient device to perform local mapping operations, global mapping operations, a combination of local and global mapping operations, etc., with respect to all these different component images of the coded image to generate a corresponding target image.

In some operational scenarios, different component images of a coded image as described herein may be scaled using different beta scale maps, respectively, as defined or specified in a beta scale data set corresponding to the coded image. Beta scale parameter values in each beta scale map (e.g., for red color channel/component, etc.) of the different beta scale maps in the coded beta scale data set may be used to enable the recipient device to perform local mapping operations, global mapping operations, a combination of local and global mapping operations, etc., with respect to a respective component image (e.g., a component image formed by codewords in the red color channel/component, etc.) of the different component images of the coded image to generate a corresponding component image of different component images of a corresponding target image.

To enable the recipient device to perform local mapping operations, the beta scale data set may define, specify, delineate and/or demarcate a plurality of (e.g., input, mutually exclusive, etc.) spatial regions in the coded image and a corresponding plurality of (e.g., target, mutually exclusive, etc.) spatial regions in the target image. Different scaling methods, curves, sets of LUTs, multi-piece polynomials, sets of scaling factors, etc., may be defined or specified in the beta scale data set for different spatial regions of the coded image and/or corresponding different spatial regions of the target image.

An example spatial region in an image as described herein may be one of: a single pixel, a single pixel block, a single spatial area formed by adjacent or contiguous pixels, the entire image, a spatial region corresponding to a visually perceptible image feature/object, a spatial region corresponding to some or all foreground depicted in the image, a spatial region corresponding to some or all background depicted in the image, a spatial region corresponding to a set of one or more moving objects depicted in the image, etc.

To enable the recipient device to perform global mapping operations, the beta scale data set may define and/or specify the entire coded image or a salient part thereof as a single (input) spatial region. Correspondingly, the beta scale data set may define and/or specify the entire target image or a salient part thereof as a single (input) spatial region. A single scaling method, curve, set of one or more LUTs, multi-piece polynomial, set of scaling factor, etc., may be defined or specified in the beta scale data set for (e.g., all spatial region(s), etc.) the entire coded image and/or the target image.

5. Overall Beta Scale Map for Some or All Channels

Figure 2A:
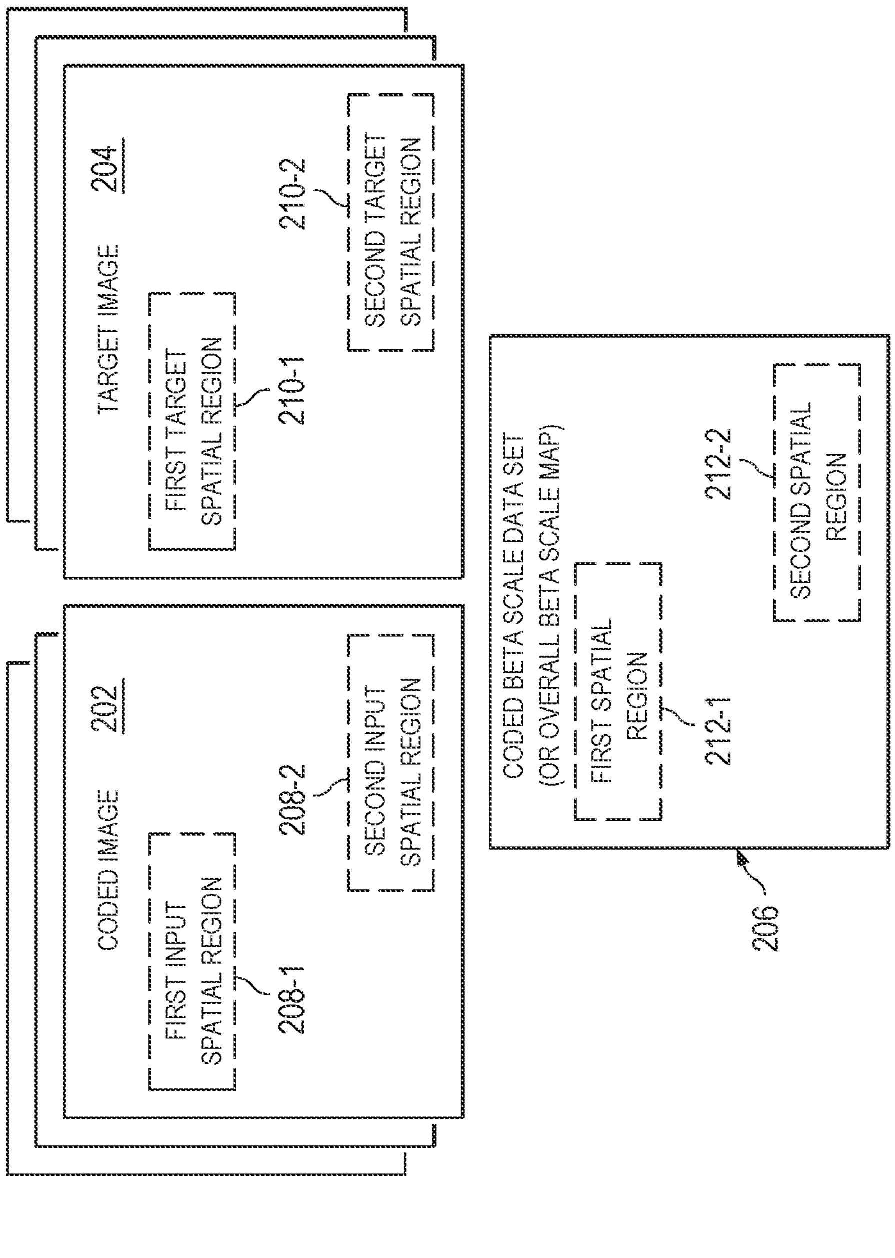
FIG. 2A through FIG. 2C illustrate example beta scale data sets.

FIG. 2A illustrates an example beta scale data set 206—which comprises a single overall beta scale map—coded along with a coded image 202 in a video signal. The overall beta scale map in the beta scale data set (206) can be generated for the coded image (202) by an upstream device and sent in the video signal to a downstream recipient device along with the image (202).

The coded image (202) may be represented in an input color space. Each pixel in the coded image (202) may comprise three (component) codewords in three (color) channels/components, respectively, of the input color space (e.g., RGB color space, YCbCr color space, etc.). Component codewords in each channel/component of the color space for all pixels or pixel locations in the coded image (202) collectively form a respective coded component image of three coded component images in the coded image (202).

The recipient device can decode the coded image (202) from the video signal to generate a corresponding decoded image comprising three component images respectively corresponding to the three coded component images in the coded image (202), subject to quantization/coding errors that can be introduced by compression/decompression and/or quantization/dequantization, etc.

The overall beta scale map in the beta scale data set (206) enables the recipient device to perform beta scaling operations on each component image of the decoded image to generate a reconstructed image that is the same as or closely approximates a target image 204. These beta scaling operations may represent, or may be equivalent to, local mapping operations, global mapping operations, a combination of local and global mapping operations, etc.

For the purpose of illustration only, the target image (204) as well as the reconstructed image may be represented in a target color space. Each pixel in the target image (204) or the reconstructed image may comprise three (component) codewords in three (color) channels/components, respectively, of the target color space (e.g., RGB color space, YCbCr color space, etc.). Component codewords in each channel/component of the color space for all pixels or pixel locations in the target image (204) or the reconstructed image collectively form a respective coded component image of three coded component images in the target image (204) or the reconstructed image.

In operational scenarios in which global mapping is to be supported, a coded beta scale data set defined or specified for a coded image or target image may comprise an overall single beta scale data subset for an overall single spatial region in some or all of the coded image or of the target image. In these operational scenarios, there is no need for the beta scale data set to demarcate or delineate a plurality of spatial regions in some or all of the coded image or of the target image. For example, in these operational scenarios, the overall single beta scale data subset may define or specify the same scaling method with the same scaling parameter values such as the same set of scaling factors—which may correspond to the same mapping curve, the same set of one or more LUTs, the same multi-piece polynomial, etc.—to be applied to codewords in (some or all spatial region(s) of) the entire coded image to generate a reconstructed image that is the same as or closely approximates the target image.

In operational scenarios in which local mapping is to be supported, a coded beta scale data set defined or specified for a coded image or target image may comprise multiple beta scale data subsets for multiple spatial regions in the coded image or target image.

As shown in FIG. 2A, the coded image (202) may comprise a plurality of (e.g., input, mutually exclusive, etc.) spatial regions such as a first input spatial region 208-1 and a second input spatial region 208-2. The coded image (202) may be of the same spatial resolution as, or alternatively may be of a different (e.g., coarser, finer, etc.) spatial resolution from, that of the target image (204).

The target image (204) may comprise a plurality of (e.g., target, mutually exclusively, etc.) spatial regions corresponding to the plurality of spatial regions in the coded image (202). As shown in FIG. 2A, a first target spatial region 210-1 in the plurality of spatial regions of the target image (204) corresponds to the first input spatial region (208-1), whereas a second target spatial region 210-2 in the plurality of spatial regions of the target image (204) corresponds to the second input spatial region (208-2).

The beta scale data set (206) or the overall beta scale map therein may comprise a plurality of beta scale data subsets for a plurality of (e.g., beta scaling, mutually exclusive, etc.) spatial regions. The plurality of spatial regions defined or specified in the beta scale data set (206) or the overall beta scale map therein corresponds to the plurality of (input) spatial regions, respectively, in the coded image (202), as well as corresponds to the plurality of (target) spatial regions, respectively, in the target image (204).

As shown in FIG. 2A, a first spatial region 212-1 in the plurality of spatial regions of the beta scale data set (206) or the overall beta scale map therein corresponds to the first input spatial region (208-1) in the coded image (202), and also corresponds to the first target spatial region (210-1) in the target image (204). Likewise, a second spatial region 212-2 in the plurality of spatial regions of the beta scale data set (206) or the overall beta scale map therein corresponds to the second input spatial region (208-2) in the coded image (202), and also corresponds to the second target spatial region (210-2) in the target image (204).

Spatial regions in the coded image (202) and corresponding spatial regions in the target image (204) may be delineated or demarcated effectively by way of spatial regions defined or specified in the beta scale data set (206) or the overall beta scale map therein. Different spatial regions in the same coded image (202) may or may not be of the same size.

In (local mapping) operational scenarios, a first beta scale data subset in the beta scale data set may define or specify a first scaling method with first scaling parameter values such as a first set of scaling factors—which may correspond to a first mapping curve, a set of one or more first LUTs, a first multi-piece polynomial, etc.—for the first spatial region (212-1). The first scaling method so specified for the first spatial region (212-1) of the beta scale data set can be applied to (pre-scaled) codewords in each of some or all channels/components of the input color space in the first input spatial region (208-1) of the coded image (202) to generate (scaled) codewords in a corresponding channel/component of some or all channels/component of the target color space in a first reconstructed spatial region (not shown) of the reconstructed image. The (scaled) codewords in the first reconstructed spatial region of the reconstructed image may be the same as or closely approximating target codewords in the first target spatial region (210-1) of the target image (204).

In the (local mapping) operational scenarios, a second beta scale data subset in the beta scale data set may define or specify a second scaling method with second scaling parameter values such as a second set of scaling factors—which may correspond to a second mapping curve, a set of one or more second LUTs, a first multi-piece polynomial, etc.—for the second spatial region (212-2). The second scaling method so specified for the second spatial region (212-2) of the beta scale data set can be applied to (pre-scaled) codewords in each of some or all channels/components of the input color space in the second input spatial region (208-2) of the coded image (202) to generate (scaled) codewords in a corresponding channel/component of some or all channels/component of the target color space in a second reconstructed spatial region (not shown) of the reconstructed image. The (scaled) codewords in the second reconstructed spatial region of the reconstructed image may be the same as or closely approximating target codewords in the second target spatial region (210-2) of the target image (204).

In some operational scenarios, one or more of the first scaling method and/or the first scaling parameter values may be different from one or more of the second scaling method and/or the second scaling parameter values.

6. Individual Beta Scale Maps for Individual Channels

Figure 2B:
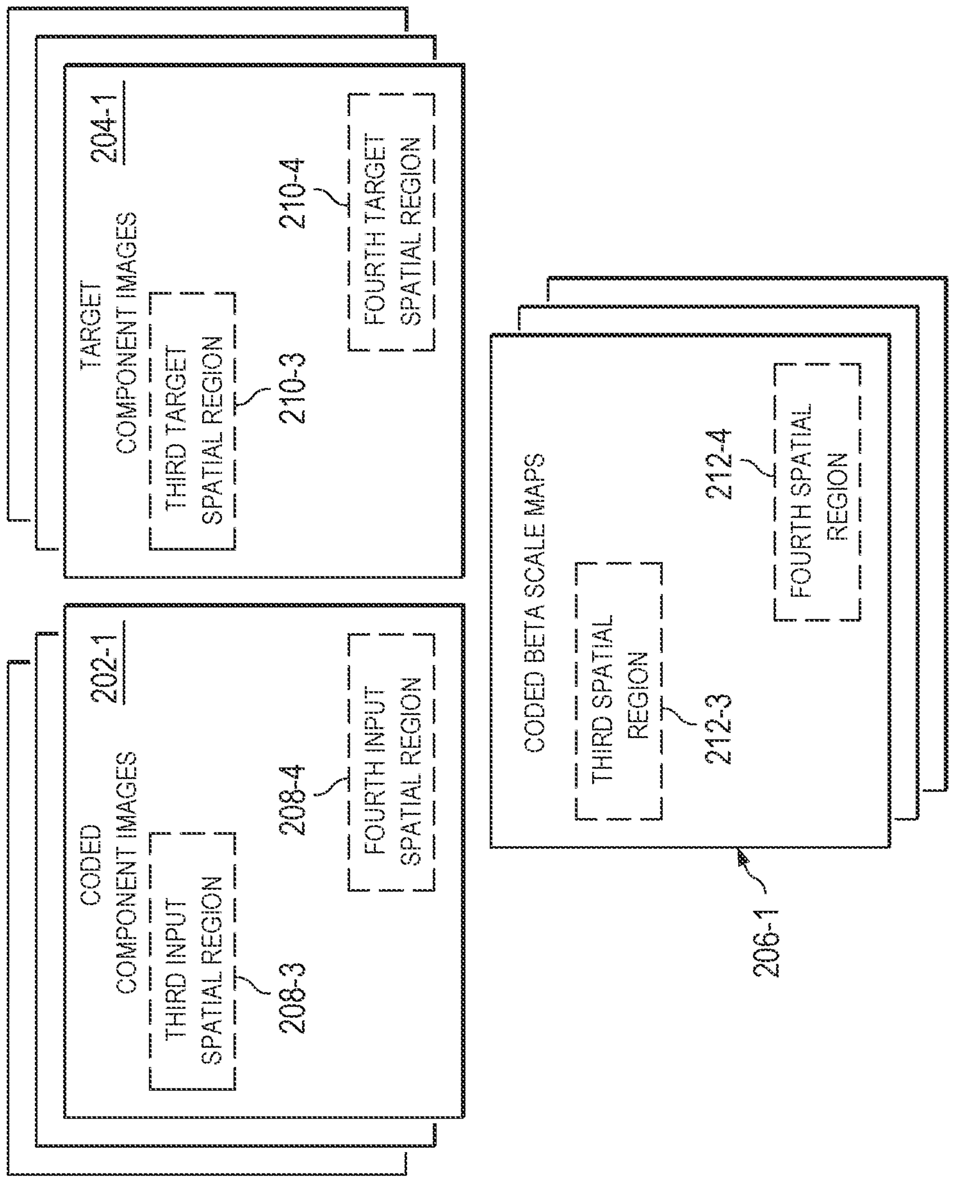

FIG. 2B illustrates an example beta scale data set comprising two or more coded beta scale maps 206-1 coded along with a coded image comprising two or more coded component images 202-1 in a video signal. The beta scale maps (206-1) in the beta scale data set can be generated for the coded component images (202-1), respectively, in the coded image (202) by an upstream device and sent in the video signal to a downstream recipient device along with the coded component images (202-1).

The coded image may be represented in an input color space. Each pixel in each component image of the coded component images (202-1) of the coded image may comprise a (component) codeword in a respective (color) channel/component of two or more (color) channels/components of the input color space (e.g., RGB color space, YCbCr color space, etc.).

The recipient device can decode the component coded images (202-1) from the video signal to generate corresponding decoded component images respectively corresponding to the coded component images (202-1) in the coded image, subject to quantization/coding errors that can be introduced by compression/decompression and/or quantization/dequantization, etc.

The beta scale maps (206-1) in the beta scale data set enable the recipient device to perform individual beta scaling operations on the decoded component images, respectively, to generate component reconstructed images of a reconstructed image (not shown). The component reconstructed images of the reconstructed image are the same as or closely approximate component target images 204-1 of a target image. These individual beta scaling operations may represent, or may be equivalent to, local mapping operations, global mapping operations, a combination of local and global mapping operations, etc.

For the purpose of illustration only, the target image as well as the reconstructed image may be represented in a target color space. Each pixel in each component image of the target component images (202-1) of the target image or the reconstructed component images of the reconstructed image may comprise a (component) codeword in a respective (color) channel/component of two or more (color) channels/components of the target color space (e.g., RGB color space, YCbCr color space, etc.).

In operational scenarios in which global mapping is to be supported, a specific beta scale map in the beta scale data set defined or specified for a specific component image of a coded image or target image may comprise a single beta scale data subset for an overall single spatial region in some or all of the specific component image of the coded image or of the target image. In these operational scenarios, there is no need for the specific beta scale map to demarcate or delineate a plurality of spatial regions in some or all of the specific component image of the coded image or of the target image. For example, in these operational scenarios, the single beta scale data subset in the specific beta scale map may define or specify the same scaling method with the same scaling parameter values such as the same set of scaling factors—which may correspond to the same mapping curve, the same set of one or more LUTs, the same multi-piece polynomial, etc.—to be applied to component codewords in (some or all spatial region(s) of) the entire specific component image of the coded image to generate a corresponding specific component image of the reconstructed image.

It should be noted that, even if global mapping is applied to some or all component images, different (global mapping) scaling methods—which may be specified in different beta scale maps in the beta scale data set—can be implemented or performed with respect to different component images of the coded image or the target image. Additionally, optionally or alternatively, a (global mapping) scaling method—which may be specified in one of different beta scale maps in the beta scale data set—can be implemented or performed with respect to one of different component images of the coded image or the target image, while a (local mapping) scaling method—which may be specified in another of the different beta scale maps in the beta scale data set—can be implemented or performed with respect to another of the different component images of the coded image or the target image.

In operational scenarios in which local mapping is to be supported, a coded beta scale map in the beta scale data set defined or specified for a component image of a coded image or target image may comprise multiple beta scale data subsets for multiple spatial regions in the component image of the coded image or target image.

As shown in FIG. 2B, a coded component image of the coded component images (202-1) may comprise a plurality of (e.g., input, mutually exclusive, etc.) spatial regions such as a third input spatial region 208-3 and a fourth input spatial region 208-4. The coded component image of the coded component images (202-1) may be of the same spatial resolution as, or alternatively may be of a different (e.g., coarser, finer, etc.) spatial resolution from, that of a corresponding target component image of the target component images (204-1).

The corresponding target component image of the target component images (204-1) may comprise a plurality of (e.g., target, mutually exclusively, etc.) spatial regions corresponding to the plurality of spatial regions in the coded component image of the coded component images (202-1). As shown in FIG. 2B, a third target spatial region 210-3 in the plurality of spatial regions of the corresponding target component image of the target component images (204-1) corresponds to the third input spatial region (208-3), whereas a fourth target spatial region 210-4 in the plurality of spatial regions of the corresponding target component image of the target component images (204-1) corresponds to the fourth input spatial region (208-4).

A corresponding beta scale map of the beta scale maps (206-1) may comprise a plurality of beta scale data subsets for a plurality of (e.g., beta scaling, mutually exclusive, etc.) spatial regions. The plurality of spatial regions defined or specified in the corresponding beta scale map of the beta scale maps (206-1) corresponds to the plurality of (input) spatial regions, respectively, in the coded component image of the coded component images (202-1), as well as corresponds to the plurality of (target) spatial regions, respectively, in the corresponding target component image of the target component image (204-1).

As shown in FIG. 2B, a third spatial region 212-3 in the plurality of spatial regions of the corresponding beta scale map of the beta scale maps (206-1) corresponds to the third input spatial region (208-3) in the coded component image of the coded component images (202-1), and also corresponds to the third target spatial region (210-3) in the corresponding target component image of the target component image (204-1). Likewise, a fourth spatial region 212-4 in the plurality of spatial regions of the corresponding beta scale map of the beta scale maps (206-1) corresponds to the fourth input spatial region (208-4) in the coded component image of the coded component images (202-1), and also corresponds to the fourth target spatial region (210-4) in the corresponding target component image of the target component image (204-1).

Spatial regions in the coded component image of the coded component images (202-1) and corresponding spatial regions in the corresponding target component image of the target component image (204-1) may be delineated or demarcated effectively by way of spatial regions defined or specified in the corresponding beta scale map of the beta scale maps (206-1). Different spatial regions in the same coded component image of the coded component images (202-1) may or may not be of the same size.

In (local mapping) operational scenarios, a third beta scale data subset in the corresponding beta scale map of the beta scale maps (206-1) may define or specify a third scaling method with third scaling parameter values such as a third set of scaling factors—which may correspond to a third mapping curve, a set of one or more third LUTs, a third multi-piece polynomial, etc.—for the third spatial region (212-3). The third scaling method so specified for the third spatial region (212-3) of the corresponding beta scale map of the beta scale maps (206-1) can be applied to (pre-scaled) component codewords in the third input spatial region (208-3) of the coded component image of the coded component images (202-1) to generate (scaled) component codewords in a third reconstructed spatial region (not shown) of the corresponding reconstructed component image of the reconstructed component images. The (scaled) component codewords in the third reconstructed spatial region of the corresponding reconstructed component image may be the same as or closely approximating target component codewords in the third target spatial region (210-3) of the corresponding target component image of the target component image (204-1).

In the (local mapping) operational scenarios, a fourth beta scale data subset in the corresponding beta scale map of the beta scale maps (206-1) may define or specify a fourth scaling method with fourth scaling parameter values such as a fourth set of scaling factors—which may correspond to a fourth mapping curve, a set of one or more fourth LUTs, a fourth multi-piece polynomial, etc.—for the fourth spatial region (212-4). The fourth scaling method so specified for the fourth spatial region (212-4) of the corresponding beta scale map of the beta scale maps (206-1) can be applied to (pre-scaled) component codewords in the fourth input spatial region (208-3) of the coded component image of the coded component images (202-1) to generate (scaled) component codewords in a fourth reconstructed spatial region (not shown) of the corresponding reconstructed component image of the reconstructed component images. The (scaled) component codewords in the fourth reconstructed spatial region of the corresponding reconstructed component image may be the same as or closely approximating target component codewords in the fourth target spatial region (210-4) of the corresponding target component image of the target component image (204-1).

In some operational scenarios, one or more of the third scaling method and/or the third scaling parameter values may be different from one or more of the fourth scaling method and/or the fourth scaling parameter values.

7. Cross-Channel Mapping

Figure 2C:
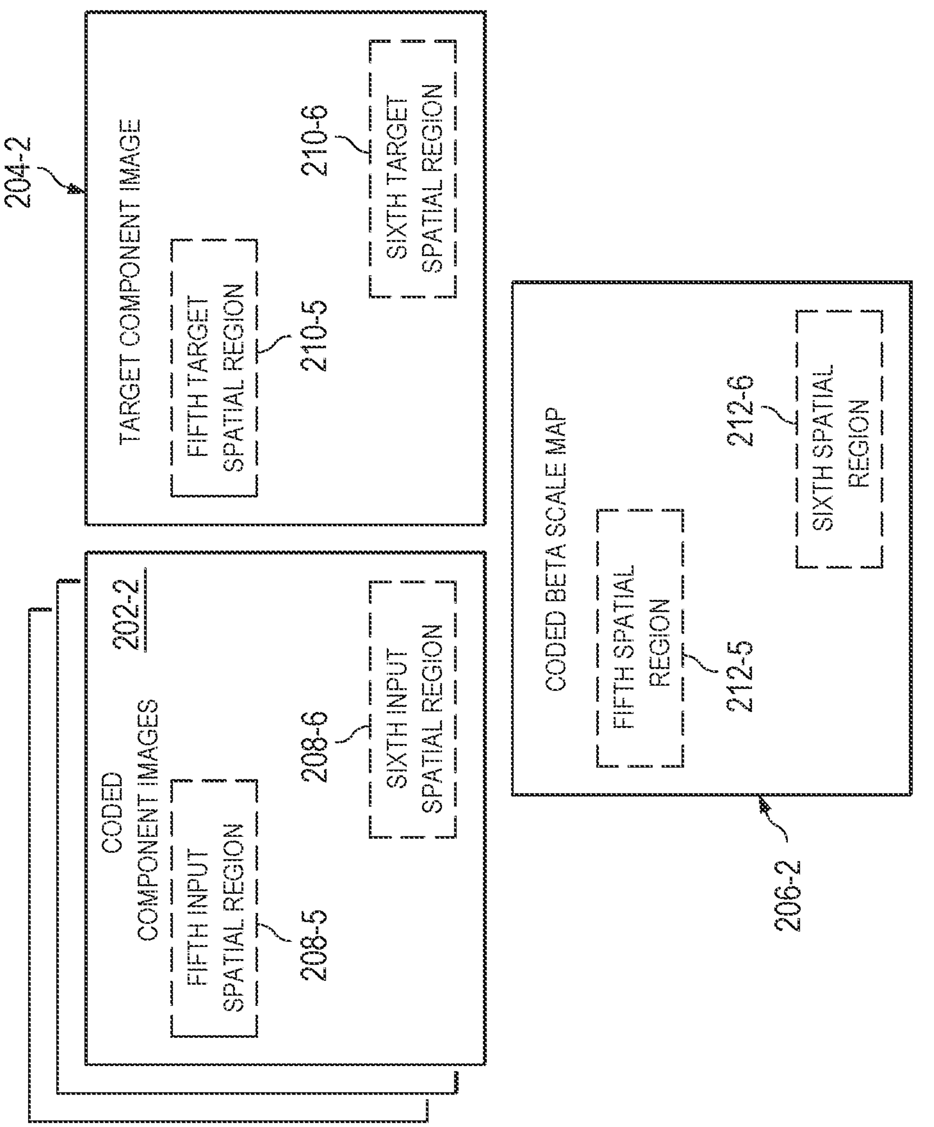

FIG. 2C illustrates an example beta scale map 206-2—which may be a subset of a beta scale data set for a coded image and/or a corresponding target image—coded along with two or more coded component images 202-2 of the coded image in a video signal. The beta scale map (206-2) can be generated by an upstream device for mapping (which may be referred to as "cross-channel mapping") the multiple coded component images (202-2) of the coded image to a single target component image 204-2 of the target image and sent in the video signal to a downstream recipient device along with the coded component images (202-2).

Additionally, optionally or alternatively, another mapping can be defined or specified with additional beta scale maps in the beta scale data set coded in the video signal for mapping (which may be referred to as "single-channel mapping") a single coded component image of the coded image to another single target component image of the target image.

Additionally, optionally or alternatively, another mapping can be defined or specified with additional beta scale maps in the beta scale data set coded in the video signal for mapping—representing another cross-channel mapping in addition to the cross-channel mapping defined or specified in the coded beta scale map (206-2)—another combination of two or more coded component images of the coded image to another single target component image of the target image.

The coded image may be represented in an input color space. Each pixel in each component image of the coded component images (202-2) of the coded image may comprise a (component) codeword in a respective (color) channel/component of two or more (color) channels/components of the input color space (e.g., RGB color space, YCbCr color space, etc.).

The recipient device can decode the component coded images (202-2) from the video signal to generate corresponding decoded component images respectively corresponding to the coded component images (202-2) in the coded image, subject to quantization/coding errors that can be introduced by compression/decompression and/or quantization/dequantization, etc.

The beta scale map (206-2) in the beta scale data set enables the recipient device to perform cross-channel (or multi-channel) beta scaling operations on the decoded component images to generate a component reconstructed image of a reconstructed image (not shown). The component reconstructed image of the reconstructed image is the same as or closely approximates a component target image 204-2 of the target image. The cross-channel beta scaling operations may represent, or may be equivalent to, cross-channel local mapping operations, cross-channel global mapping operations, a combination of cross-channel local and global mapping operations, etc.

For the purpose of illustration only, the target image as well as the reconstructed image may be represented in a target color space. Each pixel in the target component image (202-2) of the target image or the reconstructed component image of the reconstructed image may comprise a (component) codeword in a respective (color) channel/component of two or more (color) channels/components of the target color space (e.g., RGB color space, YCbCr color space, etc.).

In operational scenarios in which global mapping is to be supported, a specific beta scale map in the beta scale data set defined or specified for mapping two or more specific component images of a coded image to a specific single target component image of a target image may comprise a single beta scale data subset for an overall single spatial region in some or all of any of the two or more specific component images of the coded image or in some or all of the specific target component image of the target image. In these operational scenarios, there is no need for the specific beta scale map to demarcate or delineate a plurality of spatial regions in some or all of the specific component images of the coded image or the specific target component image of the target image. For example, in these operational scenarios, the single beta scale data subset in the specific beta scale map may define or specify the same scaling method with the same scaling parameter values such as the same set of scaling factors—which may correspond to the same mapping curve, the same set of one or more LUTs, the same multi-piece polynomial, etc.—to be applied to component codewords in (some or all spatial region(s) of) any of the entire specific component images of the coded image to generate a corresponding specific component image of the reconstructed image that is the same as or closely approximates the specific component image of the target image.

It should be noted that, even if cross-channel global mapping is applied to some or all component images, different cross-channel (global mapping) scaling methods—which may be specified in different beta scale maps in the beta scale data set—can be implemented or performed to map different combinations of coded component images of the coded image to different target component images of the target image or different reconstructed component images of the reconstructed image. Additionally, optionally or alternatively, a cross-channel (global mapping) scaling method—which may be specified in one of different beta scale maps in the beta scale data set—can be implemented or performed to map a combination of two or more component images of the coded image to a single target component image of the target image, while a single-channel or cross-channel (local mapping) scaling method—which may be specified in another of the different beta scale maps in the beta scale data set—can be implemented or performed to map a different combination of one or more coded component images of the coded image to another single target component image of the target image.

By way of example but not limitation, cross-channel local mapping is to be supported with the coded beta scale map (206-2) in the beta scale data set defined or specified for mapping the coded component images (202-2) of the coded image to the single target component image (204-2) of the target image.

As shown in FIG. 2C, each of the coded component images (202-2) of the coded image may comprise a plurality of (e.g., input, mutually exclusive, same across the coded component images (202-2), etc.) spatial regions such as a fifth input spatial region 208-5 and a sixth input spatial region 208-6.

The corresponding target component image (204-2) of the target image may comprise a plurality of (e.g., target, mutually exclusively, etc.) spatial regions corresponding to the plurality of spatial regions in each of the coded component images (202-2) of the coded image. As shown in FIG. 2C, a fifth target spatial region 210-5 in the plurality of spatial regions of the corresponding target component image (204-2) of the target image corresponds to the fifth input spatial region (208-5), whereas a sixth target spatial region 210-6 in the plurality of spatial regions of the corresponding target component image (204-2) of the target image corresponds to the sixth input spatial region (208-6).

The beta scale map (206-2) may comprise a plurality of beta scale data subsets for a plurality of (e.g., beta scaling, mutually exclusive, etc.) spatial regions. The plurality of spatial regions defined or specified in the beta scale map (206-2) corresponds to the plurality of (input) spatial regions, respectively, in each of the coded component images (202-2) of the coded image, as well as corresponds to the plurality of (target) spatial regions in the corresponding target component image (204-2) of the target image.

As shown in FIG. 2C, a fifth spatial region 212-5 in the plurality of spatial regions of the beta scale map (206-2) corresponds to the fifth input spatial region (208-5) in each of the coded component images (202-2) of the coded image, and also corresponds to the fifth target spatial region (210-5) in the corresponding target component image (206-2) of the target image. Likewise, a sixth spatial region 212-6 in the plurality of spatial regions of the beta scale map (206-2) corresponds to the sixth input spatial region (208-6) in each of the coded component images (202-2) of the coded image, and also corresponds to the sixth target spatial region (210-6) in the corresponding target component image (206-2) of the target image.

Spatial regions in each of the coded component images (202-2) of the coded image and corresponding spatial regions in the corresponding target component image (204-2) of the target image may be delineated or demarcated effectively by way of spatial regions defined or specified in the corresponding beta scale map (206-2). Different spatial regions in the same coded component image of the coded component images (202-2) may or may not be of the same size.

In (local mapping) operational scenarios, a fifth beta scale data subset in the corresponding beta scale map (206-2) may define or specify a fifth scaling method with fifth scaling parameter values such as a fifth set of scaling factors—which may correspond to a fifth mapping curve, a set of one or more fifth LUTs, a fifth multi-piece polynomial, etc.—for the fifth spatial region (212-5). The fifth scaling method so specified for the fifth spatial region (212-5) of the corresponding beta scale map (206-2) can be applied to (pre-scaled) component codewords in the fifth input spatial region (208-5) of the coded component images (202-2) to generate (scaled) component codewords in a fifth reconstructed spatial region (not shown) of the corresponding reconstructed component image of the reconstructed image. The (scaled) component codewords in the fifth reconstructed spatial region of the corresponding reconstructed component image may be the same as or closely approximating target component codewords in the fifth target spatial region (210-5) of the corresponding target component image (206-2) of the target image.

In the (local mapping) operational scenarios, a sixth beta scale data subset in the corresponding beta scale map (206-2) may define or specify a sixth scaling method with sixth scaling parameter values such as a sixth set of scaling factors—which may correspond to a sixth mapping curve, a set of one or more sixth LUTs, a sixth multi-piece polynomial, etc.—for the sixth spatial region (212-6). The sixth scaling method so specified for the sixth spatial region (212-6) of the corresponding beta scale map (206-2) can be applied to (pre-scaled) component codewords in the sixth input spatial region (208-6) of the coded component images (202-2) to generate (scaled) component codewords in a sixth reconstructed spatial region (not shown) of the corresponding reconstructed component image of the reconstructed image. The (scaled) component codewords in the sixth reconstructed spatial region of the corresponding reconstructed component image may be the same as or closely approximating target component codewords in the sixth target spatial region (210-6) of the corresponding target component image (206-2) of the target image.

In some operational scenarios, one or more of the fifth scaling method and/or the fifth scaling parameter values may be different from one or more of the sixth scaling method and/or the sixth scaling parameter values.

8. Example Beta Scale Data Representations

A beta scale map used to perform a single-channel or cross-channel mapping of coded component image(s) of a coded image to a target component image of a target image (as represented or approximated by a reconstructed component image of a reconstructed image) may be represented in a video signal in one of many different beta scale data representations.

Figure 3A:
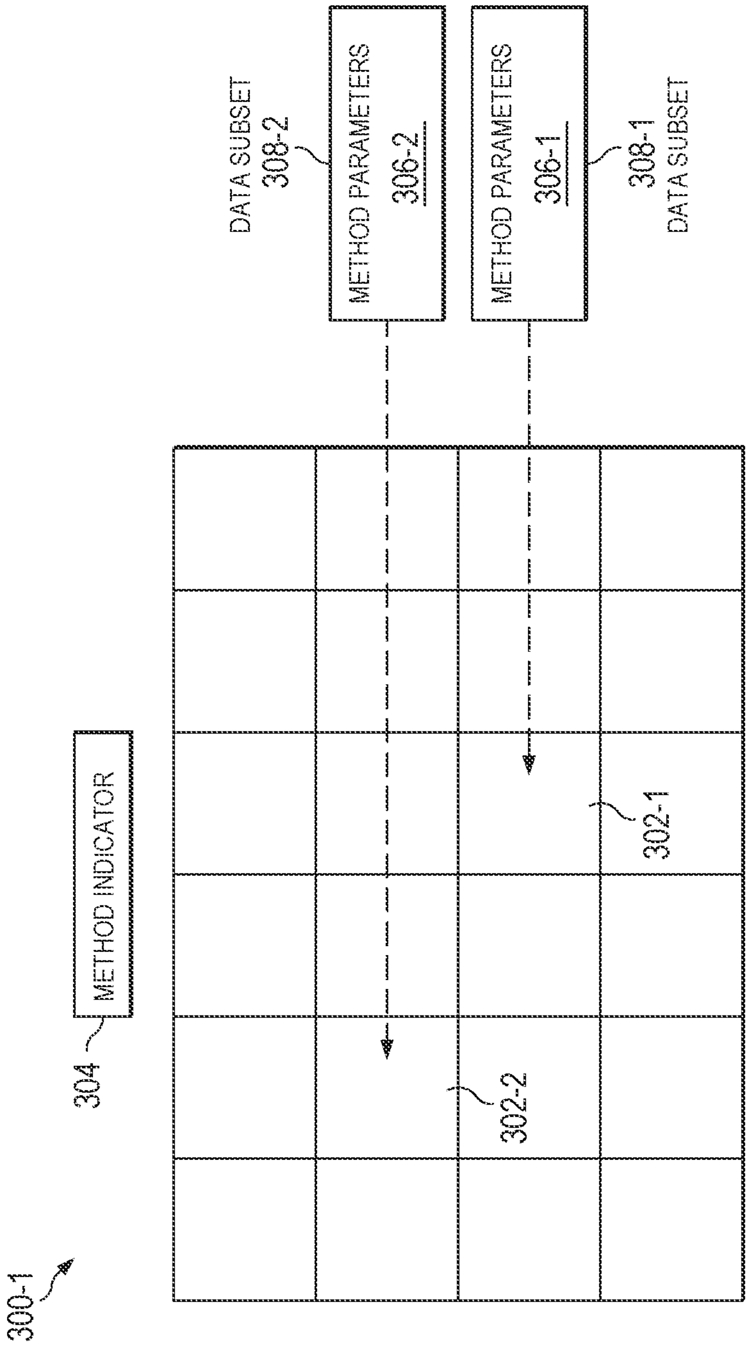
FIG. 3A through FIG. 3C illustrate example beta scale data sets.

FIG. 3A illustrates an example beta scale map 300-1 that comprises an overall method indicator 304 and one or more (e.g., array, cells of different sizes that form a mosaic, etc.) of beta scale data subsets (e.g., 308-1, 308-2, etc.) for one or more spatial regions (e.g., 302-1, 302-2, etc.). The beta scale map (300-1) may be used to perform a single-channel or cross-channel mapping of coded component image(s) of a coded image to a target component image of a target image (as represented or approximated by a reconstructed component image of a reconstructed image).

Spatial regions as described herein may correspond to, delineate or demarcate corresponding input spatial regions in each of some or all coded component image(s) of a coded image, or corresponding target spatial regions in a target component image of a target image.

For the purpose of illustration only, beta scale data subsets—or spatial regions for which the beta scale data subsets are defined or specified in a beta scale map as described herein—may be depicted as a spatial array. However, it should be noted that, in various embodiments, spatial regions represented in a beta scale map as described herein may or may not form a spatial array. For example, in some operational scenarios, these spatial regions may represent cells of varying sizes that form a mosaic. It should also be noted that, in various embodiments, a spatial region represented in a beta scale map as described herein may comprise or correspond to a single pixel or multiple pixels in the coded image or the target image.

Each beta scale data subset in the one or more beta scale data subsets (e.g., 302-1, 302-2, etc.) may be used to carry beta scaling method parameter(s) for a beta scaling method to be applied to a respective spatial region in the one or more spatial regions (e.g., 302-1, 302-2, etc.) for which the one or more beta scale data subsets are respectively defined or specified.

Each beta scale data subset in the one or more beta scale data subsets (e.g., 302-1, 302-2, etc.) may or may not carry its down beta scaling method indicator. The overall beta scaling method indicator (304) may be carried or transmitted in the video signal as a picture-level or scene-level image metadata parameter. The overall beta scaling method indicator (304) indicates a beta scaling method to be applied to all of the one or more spatial regions (e.g., 302-1, 302-2, etc.) or beta scale data subsets (e.g., 308-1, 308-2, etc.).

In an example, the overall beta scaling method indicator (304) indicates simple scaling is to be performed with respect to all of the one or more spatial regions (e.g., 302-1, 302-2, etc.), whereas method parameters (e.g., 306-1, 306-2, etc.) defined or specified in the one or more beta scale data subsets (e.g., 308-1, 308-2, etc.) for the one or more spatial regions (e.g., 302-1, 302-2, etc.) may define scaling values to be used in the simple scaling.

For instance, the method parameter(s) (306-1) defined or specified for the spatial region (302-1) represent first scaling value(s) to be applied (e.g., multiplied in a non-logarithmic representation, addition in a logarithmic representation, etc.)—and further combined with or without weighting factor(s)—to coded component codeword(s) of each pixel in the same spatial region (302-1) in the coded component image(s) of the coded image to generate a reconstructed component codeword of a respective pixel in the same spatial region in the reconstructed component image of the reconstructed image.

Likewise, the method parameter(s) (306-2) defined or specified for the spatial region (302-2) represent second scaling value(s) to be applied (e.g., multiplied in a non-logarithmic representation, addition in a logarithmic representation, etc.)—and further combined with or without weighting factor(s)—to coded component codeword(s) of each pixel in the same spatial region (302-2) in the coded component image(s) of the coded image to generate a reconstructed component codeword of a respective pixel in the same spatial region in the reconstructed component image of the reconstructed image.

In another example, the overall beta scaling method indicator (304) indicating mapping based on LUT(s) to be applied with respect to all of the one or more spatial regions (e.g., 302-1, 302-2, etc.), whereas method parameters (e.g., 306-1, 306-2, etc.) defined or specified in the one or more beta scale data subsets (e.g., 308-1, 308-2, etc.) for the one or more spatial regions (e.g., 302-1, 302-2, etc.) may define lookup table identifier(s) for preconfigured/signaled LUT(s) accessible to a recipient device.

For instance, the method parameters (306-1) defined or specified for the spatial region (302-1) may be used to identify first LUT(s). Coded component codeword(s) of each pixel in the same spatial region (302-1) in the coded component image(s) of the coded image can be used as lookup keys to look up in the first LUT(s) to retrieve lookup value(s). These lookup values can be further combined with or without weighting factors to generate a reconstructed component codeword of a respective pixel in the same spatial region (302-1) in the reconstructed component image of the reconstructed image.

Likewise, the method parameters (306-2) defined or specified for the spatial region (302-2) may be used to identify second LUT(s). Coded component codeword(s) of each pixel in the same spatial region (302-2) in the coded component image(s) of the coded image can be used as lookup keys to look up in the second LUT(s) to retrieve lookup value(s). These lookup values can be further combined with or without weighting factors to generate a reconstructed component codeword of a respective pixel in the same spatial region (302-2) in the reconstructed component image of the reconstructed image.

As noted, a reconstructed component codeword of a pixel in the reconstructed component image of the reconstructed image is the same as or approximates a respective pixel in the same pixel or spatial location in the target component image of the target image.

Figure 3B:
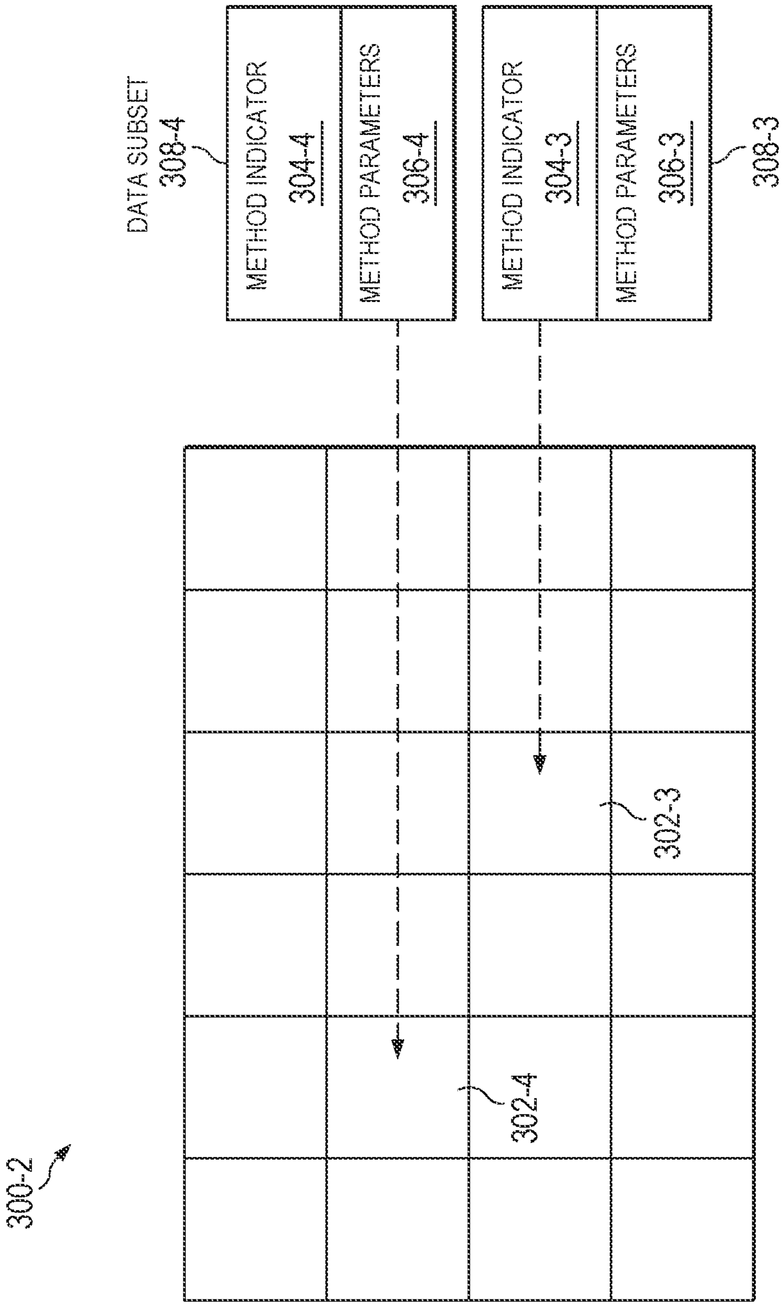

FIG. 3B illustrates an example beta scale map 300-2 that comprises one or more (e.g., array, cells of different sizes that form a mosaic, etc.) of beta scale data subsets (e.g., 308-3, 308-4, etc.) for one or more spatial regions (e.g., 302-3, 302-4, etc.). The beta scale map (300-2) may be used to perform a single-channel or cross-channel mapping of coded component image(s) of a coded image to a target component image of a target image (as represented or approximated by a reconstructed component image of a reconstructed image).

The one or more beta scale data subsets (e.g., 308-3, 308-4, etc.) may be used to carry individual beta scaling method indicators (e.g., 304-3, 304-4, etc.) and their respective individual beta scaling method parameters (e.g., 306-3, 306-4, etc.) to be applied to the one or more spatial regions (e.g., 302-3, 302-4, etc.), respectively.

The individual beta scaling method indicators (e.g., 304-3, 304-4, etc.) may, but are not limited to. indicate different beta scaling methods to be applied to different spatial regions (e.g., 302-3, 302-4, etc.). The individual beta scaling method indicators (e.g., 304-3, 304-4, etc.) may be carried or transmitted in the video signal as sub-picture-level (e.g., per spatial region, per group of spatial region, per macroblock, per block, per subblock, per pixel, etc.) image metadata parameter.

In some operational scenarios, the individual beta scaling method indicators (e.g., 304-3, 304-4, etc.) may have one to one (1-1) correspondence with the spatial regions (e.g., 302-3, 302-4, etc.). In some operational scenarios, the individual beta scaling method indicators (e.g., 304-3, 304-4, etc.) may have one to many correspondence with the spatial regions (e.g., 302-3, 302-4, etc.).

Likewise, in some operational scenarios, the individual beta scaling method parameters (e.g., 306-3, 306-4, etc.) may have one to one (1-1) correspondence with the spatial regions (e.g., 302-3, 302-4, etc.). In some operational scenarios, the individual beta scaling method parameters (e.g., 306-3, 306-4, etc.) may have one to many correspondence with the spatial regions (e.g., 302-3, 302-4, etc.).

Additionally, optionally or alternatively, a relationship or correspondence between the individual beta scaling method indicators (e.g., 304-3, 304-4, etc.) and the spatial regions (e.g., 302-3, 302-4, etc.) may or may not be the same as a relationship or correspondence between the individual beta scaling method parameters (e.g., 306-3, 306-4, etc.) and the spatial regions (e.g., 302-3, 302-4, etc.).

For example, a coded image or a target image corresponding thereto may comprise a plurality of groups of spatial regions. An individual beta scaling method indicator (e.g., 304-3, 304-4, etc.) may be defined or specified for a group of spatial regions in the plurality of spatial regions, whereas different individual beta scaling method parameters (e.g., 306-3, 306-4, etc.) may be defined or specified for different spatial regions in the group of spatial regions.

For example, the beta scaling method indicator (304-3) may indicate simple scaling is to be performed with respect to the spatial region (302-3), whereas method parameters (306-3) defined or specified for the spatial region (302-3) may define scaling values to be used in the simple scaling. The beta scaling method indicator (304-4) may indicate LUT(s) is to be looked up and applied with respect to the spatial region (302-4), whereas method parameters (306-4) defined or specified for the spatial region (302-4) may define lookup table identifier(s) for preconfigured/signaled LUT(s).

Figure 3C:
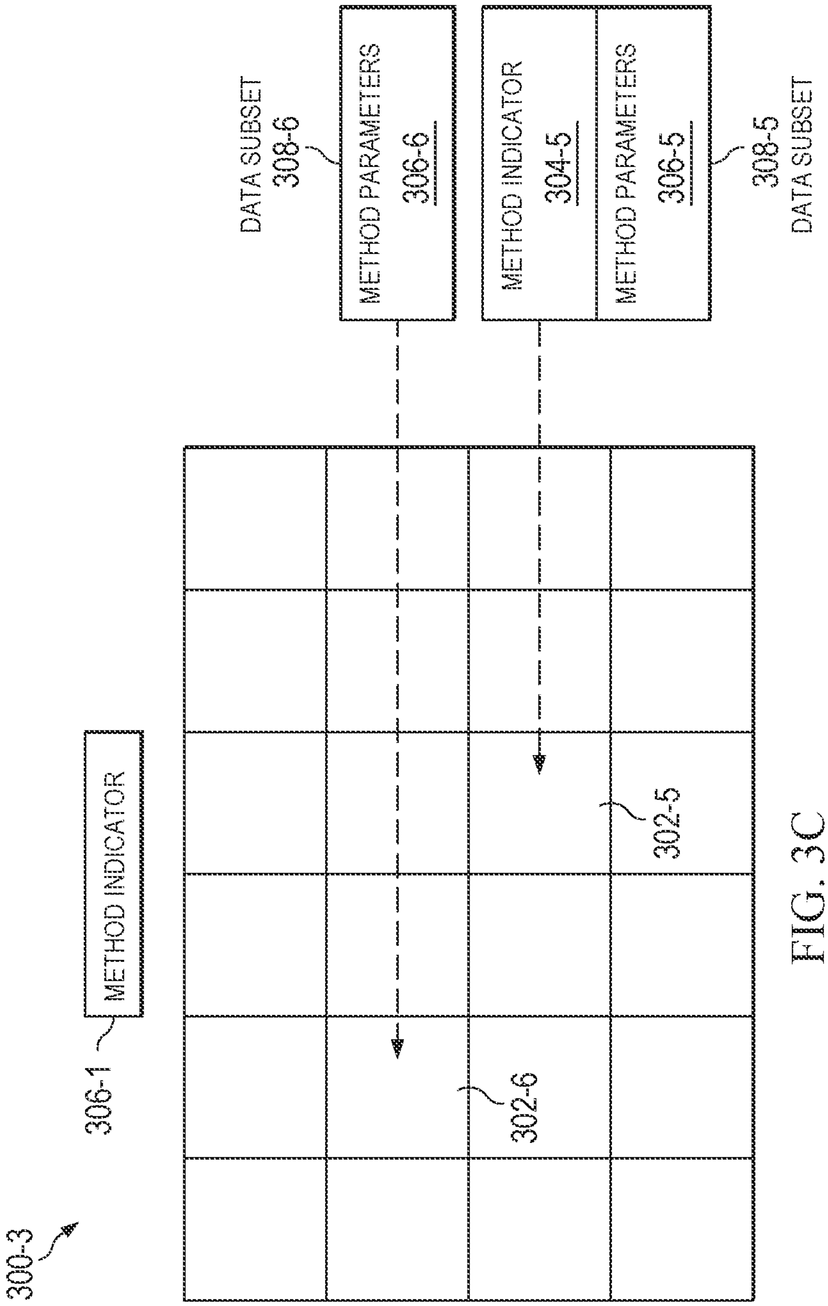

FIG. 3C illustrates an example beta scale map 300-3 that comprises a default method indicator 304-1 and one or more (e.g., array, cells of different sizes that form a mosaic, etc.) of beta scale data subsets (e.g., 308-5, 308-6, etc.) for one or more spatial regions (e.g., 302-5, 302-6, etc.). The beta scale map (300-3) may be used to perform a single-channel or cross-channel mapping of coded component image(s) of a coded image to a target component image of a target image (as represented or approximated by a reconstructed component image of a reconstructed image).

Each beta scale data subset in the one or more beta scale data subsets (e.g., 308-5, 308-6, etc.) may be used to carry beta scaling method parameter(s) for a beta scaling method to be applied to a respective spatial region in the one or more spatial regions for which the one or more beta scale data subsets are respectively defined or specified.

The default beta scaling method indicator (304-1) indicates a beta scaling method to be applied to any spatial regions (e.g., 302-6, etc.) for which corresponding beta scale data subsets (e.g., 308-6, etc.) exclude or do not contain beta scaling method indicators. The overall beta scaling method indicator (304) may be carried or transmitted in the video signal as a picture-level or scene-level image metadata parameter.

The individual beta scaling method indicators (e.g., 304-5, etc.) may, but are not limited to indicate different beta scaling methods to be applied to corresponding spatial regions (e.g., 302-5, etc.). The individual beta scaling method indicators (e.g., 304-5, etc.) may be carried or transmitted in the video signal as sub-picture-level (e.g., per spatial region, per group of spatial region, per macroblock, per block, per subblock, per pixel, etc.) image metadata parameter.

For example, the default beta scaling method indicator (304-1) may indicate simple scaling is to be performed with respect to any spatial regions (e.g., 302-6, etc.) for which corresponding beta scale data subsets (e.g., 308-6, etc.) exclude or do not contain beta scaling method indicators, whereas method parameters (e.g., 306-6, etc.) defined or specified in the corresponding beta scale data subsets (e.g., 308-6, etc.) for these spatial regions (e.g., 302-6, etc.) may define scaling values to be used in the simple scaling.

The beta scaling method indicator (304-5) may indicate LUT(s) is to be looked up and applied with respect to the spatial region (302-5), whereas method parameters (306-5) defined or specified for the spatial region (302-5) may define lookup table identifier(s) for preconfigured/signaled LUT(s).

For the purpose of illustration only, it has been described that an overall method indicator can be defined for some or all spatial regions of an image and carried as a picture-level, sequence-level, or scene-level parameter. It should be noted that, in various embodiments, an overall method parameter such as a simple ratio or scaling value can also be defined for some or all spatial regions of an image and carried as a picture-level, sequence-level, or scene-level parameter. In addition, an overall method indicator or a method parameter can be defined for some or all images of a group of picture, a scene, or an image sequence.

9. Beta Scaling in Lieu of Other Image Processing Operations

Example global and/or local mapping may be performed by way of beta scaling operations under techniques as described herein. These beta scaling operations are equivalent to, and hence can be used to replace some or all image processing operations (other than the beta scaling operations). These image processing operations may include, but are not necessarily limited to only, any, some or all of: tone mapping, color space conversion, display mapping, perceptual quantization, non-perceptual quantization, image blending, image mixing, linear image mapping, non-linear image mapping, applying electro-to-optical transfer function (EOTF), applying electro-to-electro transfer function (EETF), applying opto-to-electro transfer function (OETF), downsampling/upsampling, etc.

Tone mapping refers to mapping that converts a pre-tone-mapped image of a first dynamic range (or first brightness or luminance range) to a tone-mapped image of a second dynamic range (or second brightness or luminance range) different from the first dynamic range.

Under some approaches, tone mapping may be implemented with lookup table, single- or multi-piece polynomials, mapping curves, etc., that are generated dynamically at runtime and signaled to a recipient device. Example tone mapping operations are described in U.S. Pat. No. 9,961,237, which is incorporated herein by reference in its entirety.

In contrast, tone mapping under techniques as described herein can be implemented, incorporated into, or performed by way of, beta scaling. Simple scaling or more complex scaling including but not limited to LUT-based scaling may be performed. Additionally, optionally or alternatively, local tone mapping that applies different tone mapping relationships to different spatial regions of the coded image may also be implemented, incorporated into, or performed by way of, beta scaling. For example, different local tone mappings—corresponding to different lookup tables, different single- or multi-piece polynomials, different mapping curves, etc.—can be incorporated into the same beta scale map. Different beta scaling parameters or different beta scaling methods can be specified for different spatial regions for the purpose of mapping a coded image to a target image. As a result, both global and local mapping can be readily and relatively efficiently realized by way of beta scaling. Instead of using a relatively large bitrate to deliver operational parameters to specify LUTs, tone mapping curves, polynomials, etc., under techniques as described herein, beta scale maps comprising simple ratios or LUT identifiers (e.g., for LUTs already preconfigured on a recipient device, etc.) or other types of beta scale data can be delivered to the recipient device in lieu of these operational parameters. Additionally, optionally or alternatively, numerical repetitions existing in the beta scale maps can be exploited for further compression with adaptive coding to reduce the bitrate used to signal or transmit the beta scale maps.

Color space conversion refers to mapping pre-color-space-converted image represented in first color components/channels of a first color space to a color-space-converted image represented in second color components/channels of a second color space different from the first color space.

Under some approaches, color space conversion may be implemented as a separate image processing operation to apply color space conversion matrixes to codewords of a coded image at runtime by a recipient device. Example color conversion operations are described in the previously mentioned U.S. Pat. No. 9,961,237.

In contrast, color space conversion under techniques as described herein can be implemented, incorporated into, or performed by way of, beta scaling. For example, the same beta scaling can be used to incorporate or implement in lieu of color space conversion and non-color-space-conversion including but not limited to tone mapping. Simple scaling or more complex scaling including but not limited to LUT-based scaling may be performed only once to realize effects of both the color space conversion and non-color-space-conversion operations. As a result, matrix operations specific to color space conversion can be avoided under techniques as described herein.

Display mapping refers to mapping a pre-display-mapped image optimized for viewing with a first image display of first display capabilities (e.g., peak luminance, darkest black level, contrasts, supported spatial resolutions, image supported image refresh rates, etc.) to a display-mapped image for optimized for viewing with a second image display of second display capabilities that are different from the first display capabilities.

Under some approaches, (e.g., content dependent, per-image, per-scene, etc.) DM image metadata (e.g., specifying display capabilities, specifying, image display types, specifying minimum, average or maximum luminance levels of an image, etc.) may be transmitted or provided in the video signal from an upstream device to a recipient device. The DM metadata can be decoded and used by the recipient device to perform or implement display mapping as separate image processing operations. These image processing operations generate specific display mapping relationships or curves using the DM image metadata and one or more specific or applicable transfer functions (e.g., EETF, EOTFs, OETFs, etc.), and then apply these specific display mapping relationships or curves to each codeword of the coded image for the first image display of the first display capabilities to the first image display of the first display capabilities at runtime by a recipient device. Example display mapping operations are described in the previously mentioned U.S. Pat. No. 9,961,237.

In contrast, display management under techniques as described herein can be implemented, incorporated into, or performed by way of, beta scaling. For example, the same beta scaling can be used to incorporate or implement in lieu of DM operations and non-DM operations including but not limited to tone mapping and color space conversion. Simple scaling or more complex scaling including but not limited to LUT-based scaling may be performed only once to realize effects of both the DM operations and non-DM operations. As a result, relatively complicated DM operations can be avoided under techniques as described herein.

10. Example Process Flows

Figure 4A:
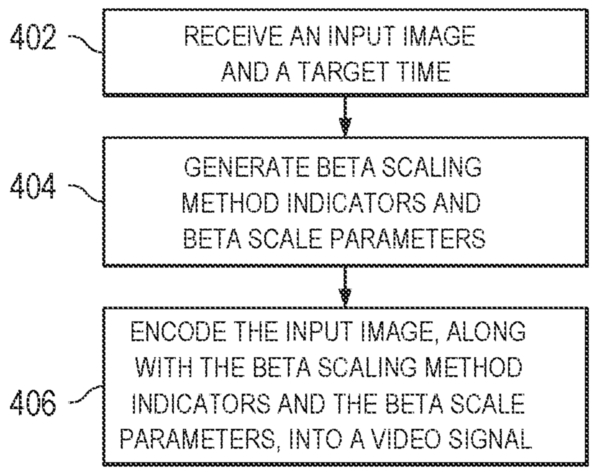
FIG. 4A and FIG. 4B illustrate example process flows.

FIG. 4A illustrates an example process flow according to an example embodiment of the present invention. In some example embodiments, one or more computing devices or components may perform this process flow. In block 402, an image processing device (e.g., an upstream device, an encoder device, a transcoder, a media streaming server, etc.) receives an input image to be coded into a video signal and a target image. The input image and the target image depict same visual content.

In block 404, the image processing device generates one or more beta scaling method indicators and one or more sets of one or more beta scale parameters. The one or more scaling methods indicators indicate one or more beta scaling methods that use the one or more sets of beta scale parameters to perform beta scaling operations on the input image to generate a reconstructed image to approximate the target image.

In block 406, the image processing device encodes the input image, along with the one or more beta scaling method indicators and the one or more sets of beta scale parameters, into the video signal for allowing a recipient device of the video signal to generate the reconstructed image.

In an embodiment, the reconstructed image and the target image are same in one or more of: dynamic range, color gamut, spatial resolution, color space, etc.

In an embodiment, the reconstructed image represents one of: a standard dynamic range image, a high dynamic range image, a display mapped image that is optimized for rendering on a target image display, etc.

In an embodiment, the input image includes two or more different spatial regions; the two or more different spatial regions are differently scaled with two or more different combinations of beta scaling methods and beta scaling parameters formed by the one or more beta scaling methods and the one or more sets of beta scale parameters.

In an embodiment, at least a part of the one or more beta scaling methods and the one or more sets of beta scale parameters is carried in a beta scale map that include one or more spatial regions spatially demarcating the input image and the target image; at least a part of the one or more beta scaling methods and the one or more sets of beta scale parameters is encoded as one or more of: image-level image metadata portions, sequence-level image metadata portions, scene-level image metadata portions, etc.

In an embodiment, the beta scaling operations include one of: simple scaling with scaling factors, applying one or more codeword mapping relationships to map codewords of the input image to generate corresponding codeword of the reconstructed image, etc.

In an embodiment, the one or more codeword mapping relationships includes one of: a codeword mapping relationship preconfigured with the recipient device, a codeword mapping relationship not delivered with the video signal, a codeword mapping relationship identified by one or more of a beta scaling method indicator in the one or more beta scaling method indicators or a set of beta scale parameters in the one or more sets of beta scale parameters, etc.

In an embodiment, the input image is encoded in a base layer of the video signal.

In an embodiment, at least a part of the one or more beta scaling methods and the one or more sets of beta scale parameters represents scaling factors.

In an embodiment, the beta scaling operations are performed in place of one or more of: global tone mapping, local tone mapping, display mapping operations, color space conversion, linear mapping, non-linear mapping, etc.

In an embodiment, the beta scaling operations include one or more of: single-channel mapping operations each mapping codewords in a single color channel of an input color space to reconstructed codewords in a single color channel of an output color space, cross-channel mapping operations each of which maps codewords in two or more color channels of an input color space to reconstructed codewords in a single color channel of an output color space, etc.

Figure 4B:
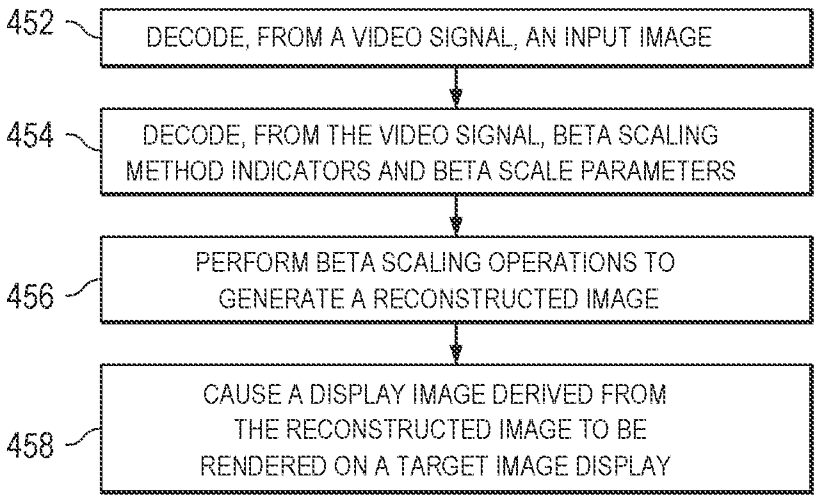

FIG. 4B illustrates an example process flow according to an example embodiment of the present invention. In some example embodiments, one or more computing devices or components may perform this process flow. In block 452, a recipient device decodes, from a video signal, an input image.

In block 454, the recipient device decodes, from the video signal, one or more beta scaling method indicators and one or more sets of one or more beta scale parameters.

In block 456, the recipient device performs beta scaling operations as specified with the one or more beta scaling method indicators and one or more sets of one or more beta scale parameters on the input image to generate a reconstructed image.

In block 458, the recipient device causes a display image derived from the reconstructed image to be rendered on a target image display.

In an embodiment, the target image display represents one of: a RGB image, an YCbCr image, or an image represented in another color space.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

11. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
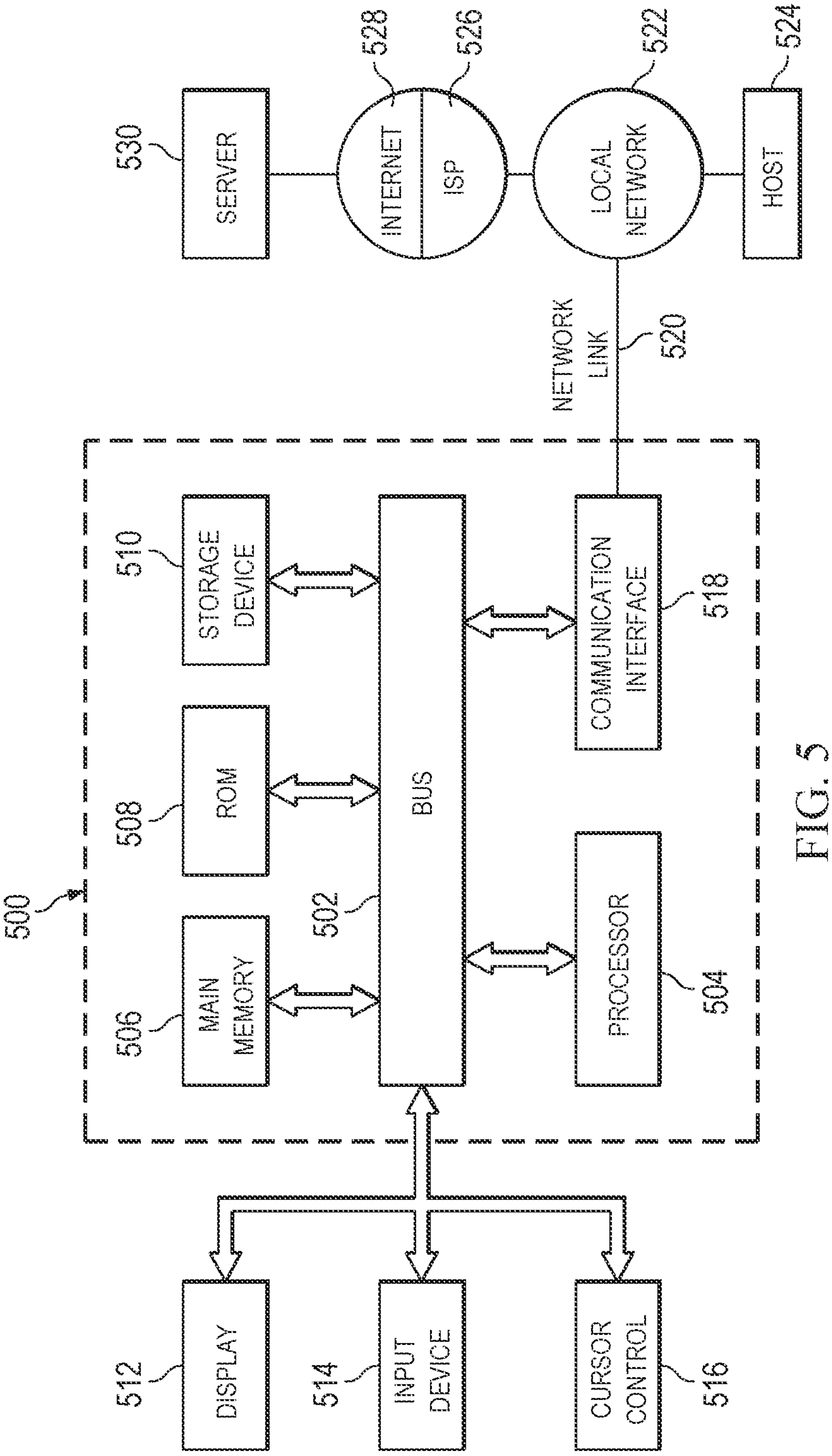
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

12. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following Enumerated Example Embodiments (EEEs):

EEE1. A method comprising:

- receiving an input image to be coded into a video signal and a target image, wherein the input image and the target image depict same visual content;
- generating one or more beta scaling method indicators and one or more sets of one or more beta scale parameters, wherein the one or more scaling methods indicators indicate one or more beta scaling methods that use the one or more sets of beta scale parameters to perform beta scaling operations on the input image to generate a reconstructed image to approximate the target image;
- encoding the input image, along with the one or more beta scaling method indicators and the one or more sets of beta scale parameters, into the video signal for allowing a recipient device of the video signal to generate the reconstructed image.

EEE2. The method of EEE1, wherein the reconstructed image and the target image are same in one or more of: dynamic range, color gamut, spatial resolution, or color space.

EEE3. The method of EEE1 or EEE2, wherein the reconstructed image represents one of: a standard dynamic range image, a high dynamic range image, or a display mapped image that is optimized for rendering on a target image display.

EEE4. The method of any of EEEs 1-3, wherein the input image includes two or more different spatial regions; wherein the two or more different spatial regions are differently scaled with two or more different combinations of beta scaling methods and beta scaling parameters formed by the one or more beta scaling methods and the one or more sets of beta scale parameters.

EEE5. The method of any of EEEs 1-4, wherein at least a part of the one or more beta scaling methods and the one or more sets of beta scale parameters is carried in a beta scale map that include one or more spatial regions spatially demarcating the input image and the target image; wherein at least a part of the one or more beta scaling methods and the one or more sets of beta scale parameters is encoded as one or more of: image-level image metadata portions, sequence-level image metadata portions, or scene-level image metadata portions.

EEE6. The method of any of EEEs 1-5, wherein the beta scaling operations include one of: simple scaling with scaling factors, or applying one or more codeword mapping relationships to map codewords of the input image to generate corresponding codeword of the reconstructed image.

EEE7. The method of EEE6, wherein the one or more codeword mapping relationships includes one of: a codeword mapping relationship preconfigured with the recipient device, a codeword mapping relationship not delivered with the video signal, or a codeword mapping relationship identified by one or more of a beta scaling method indicator in the one or more beta scaling method indicators or a set of beta scale parameters in the one or more sets of beta scale parameters.

EEE8. The method of any of EEEs 1-7, wherein the input image is encoded in a base layer of the video signal.

EEE9. The method of any of EEEs 1-8, wherein at least a part of the one or more beta scaling methods and the one or more sets of beta scale parameters represents scaling factors.

EEE10. The method of any of EEEs 1-9, wherein the beta scaling operations are performed in place of one or more of: global tone mapping, local tone mapping, display mapping operations, color space conversion, linear mapping, or non-linear mapping.

EEE11. The method of any of EEEs 1-10, wherein the beta scaling operations include one or more of: single-channel mapping operations each of which maps codewords in a single color channel of an input color space to reconstructed codewords in a single color channel of an output color space, or cross-channel mapping operations each of which maps codewords in two or more color channels of an input color space to reconstructed codewords in a single color channel of an output color space.

EEE12. A method comprising:
- decoding, from a video signal, an input image;
- decoding, from the video signal, one or more beta scaling method indicators and one or more sets of one or more beta scale parameters;
- performing beta scaling operations as specified with the one or more beta scaling method indicators and one or more sets of one or more beta scale parameters on the input image to generate a reconstructed image;
- causing a display image derived from the reconstructed image to be rendered on a target image display.

EEE13. The method of EEE 12, wherein the target image display represents one of: a RGB image, an YCbCr image, or an image represented in another color space.

EEE14. An apparatus performing any of the methods as recited in EEEs 1-13.

EEE15. A non-transitory computer readable storage medium, storing software instructions, which when executed by one or more processors cause performance of the method recited in any of EEEs 1-13.

The invention claimed is:

1. A method comprising:
- receiving an input image to be coded into a video signal and a target image, wherein the input image and the target image depict same visual content;
- generating one or more beta scaling method indicators and one or more sets of one or more beta scale parameters, wherein the one or more beta scaling method indicators indicate one or more beta scaling methods that use the one or more sets of one or more beta scale parameters to perform beta scaling operations on the input image to generate a reconstructed image to approximate the target image and wherein the one or more beta scaling methods and/or the one or more sets of one or more beta scale parameters are individually selected for scaling pixel values or codeword values in different spatial regions of the input image;
- encoding the input image, along with the one or more beta scaling method indicators and the one or more sets of one or more beta scale parameters, into the video signal for allowing a recipient device of the video signal to generate the reconstructed image.

2. The method of claim 1, wherein the reconstructed image and the target image are same in one or more of: dynamic range, color gamut, spatial resolution, or color space.

3. The method of claim 1, wherein the reconstructed image represents one of: a standard dynamic range image, a high dynamic range image, wherein the high dynamic range is wider than the standard dynamic range, or a display mapped image that is optimized for rendering on a target image display.

4. The method of claim 1, wherein the input image includes two or more different spatial regions; wherein the two or more different spatial regions are differently scaled with two or more different combinations of beta scaling methods and beta scaling parameters formed by the one or more beta scaling methods and the one or more sets of one or more beta scale parameters.

5. The method of claim 1, wherein an overall beta scaling indicator indicating a beta scaling method to be applied to all of the different spatial regions is generated.

6. The method of claim 1, wherein at least a part of the one or more beta scaling method indicators and the one or more sets of one or more beta scale parameters is carried in a beta scale map and wherein at least a part of the one or more beta scaling method indicators and the one or more sets of one or more beta scale parameters is encoded as one or more of: image-level image metadata portions, sequence-level image metadata portions, or scene-level image metadata portions.

7. The method of claim 1, wherein the one or more sets of one or more beta scale parameters defined for a spatial region of the input image represent scaling values to be applied to coded component codewords of each pixel in the same spatial region in a coded component image of the coded input image to generate a reconstructed component codeword of a respective pixel in the same spatial region in a reconstructed component image of the reconstructed image.

8. The method of claim 7, wherein the scaling values are multiplied in a non-logarithmic representation or are added in a logarithmic representation to the coded component codewords of each pixel in the same spatial region.

9. The method of claim 7, wherein the scaling values are combined with or without weighting factors.

10. The method of claim 1, wherein the beta scaling operations include one or more of: multiplications and/or additions, non-linear scaling operations, Look-Up-Table (LUT) based scaling, simple scaling with scaling factors, or applying one or more codeword mapping to map codewords of the input image to generate corresponding codeword of the reconstructed image.

11. The method of claim 10, wherein the one or more codeword mapping includes one of: a codeword mapping preconfigured with the recipient device, a codeword mapping not delivered with the video signal, or a codeword mapping identified by one or more of a beta scaling method indicator in the one or more beta scaling method indicators or a set of beta scale parameters in the one or more sets of one or more beta scale parameters.

12. The method of claim 1, wherein the input image is encoded in a base layer of the video signal.

13. The method of claim 1, wherein at least a part of the one or more sets of one or more beta scale parameters represents scaling factors.

14. The method of claim 1, wherein the beta scaling operations are performed in place of one or more of: global tone mapping, local tone mapping, display mapping operations, color space conversion, linear mapping, or non-linear mapping.

15. The method of claim 1, wherein the beta scaling operations include one or more of: single-channel mapping operations each of which maps codewords in a single color channel of an input color space to reconstructed codewords in a single color channel of an output color space, or cross-channel mapping operations each of which maps codewords in two or more color channels of an input color space to reconstructed codewords in a single color channel of an output color space.

16. The method of claim 1, wherein the spatial regions spatially demarcate the input image and the target image.

17. An apparatus performing the method as recited in claim 1.

18. A non-transitory computer readable storage medium, storing software instructions, which when executed by one or more processors cause performance of the method recited in claim 1.

19. A method comprising:

decoding, from a video signal, an input image;

decoding, from the video signal, one or more beta scaling method indicators and one or more sets of one or more beta scale parameters, wherein the one or more beta scaling method indicators indicate one or more beta scaling methods;

performing beta scaling operations on the input image as specified with the one or more beta scaling method indicators and the one or more sets of one or more beta scale parameters to generate a reconstructed image, wherein the one or more beta scaling methods and/or the one or more sets of one or more beta scale parameters are individually selected for scaling pixel values or codeword values in different spatial regions of the input image;

causing a display image derived from the reconstructed image to be rendered on a target image display.

20. The method of claim 19, wherein the target image display represents one of: a RGB image, an YCbCr image, or an image represented in another color space.

* * * * *